US012804618B2

(12) United States Patent
Liu et al.

(10) Patent No.: US 12,804,618 B2
(45) Date of Patent: Nov. 17, 2026

(54) USER EQUIPMENT AND METHOD THEREOF FOR PERFORMING A RANDOM

(71) Applicant: Apogee 5G Global, LLC, Plano, TX (US)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 301 days.

(21) Appl. No.: 17/887,521

(22) Filed: Aug. 15, 2022

(65) Prior Publication Data

US 2022/0394696 A1 Dec. 8, 2022

Related U.S. Application Data

(63) Continuation of application No. PCT/CN2021/079669, filed on Mar. 9, 2021.

(30) Foreign Application Priority Data

Mar. 12, 2020 (CN) ........................ 202010171424.X
Mar. 27, 2020 (CN) ........................ 202010228744.4

(51) Int. Cl.
*H04L 5/00* (2006.01)
*H04W 72/044* (2023.01)
(Continued)

(52) U.S. Cl.
CPC ...... *H04W 72/044* (2013.01); *H04W 74/0833* (2013.01); *H04W 74/0836* (2024.01)

(58) Field of Classification Search
CPC ............. H04W 72/044; H04W 72/542; H04W 74/0833; H04L 5/0051; H04L 27/2613
See application file for complete search history.

(56) References Cited

U.S. PATENT DOCUMENTS 11,219,016 B2 1/2022 Liu et al.
12,414,108 B2 9/2025 Hu et al.
(Continued)

FOREIGN PATENT DOCUMENTS

CN 110366191 A 10/2019
CN 110574484 A 12/2019
(Continued)

OTHER PUBLICATIONS

CN202010171424.X Notification to Grant Patent Right for Invention dated Mar. 18, 2022.
(Continued)

*Primary Examiner* — Lakeram Jangbahadur
(74) *Attorney, Agent, or Firm* — Volpe Koenig

(57) ABSTRACT

The present disclosure provides a method and a device in a node for wireless communications. The first node receives a first reference-signal-resource set; selects a first signature feature out of a candidate sequence group in a first period, transmits a first signature sequence on a first time-frequency resource block; when the first signature sequence is associated with a shared channel resource unit in the first period, monitors a second signal in the second time window; and when the first signature sequence is not associated with any shared channel resource unit in the first period, monitors a second signal in a second time window; measuring at the first reference-signal-resource set is used for determining a first channel quality; the first signature sequence is a candidate sequence in the candidate sequence group in the first period. The present disclosure ensures access delay demands of 2-step random access procedure.

20 Claims, 6 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2015/0280881 A1* | 10/2015 | Gao | H04W 48/12 370/329 |
| 2018/0279376 A1* | 9/2018 | Dinan | H04W 74/0833 |
| 2019/0104551 A1* | 4/2019 | Deenoo | H04W 72/0446 |
| 2019/0320467 A1* | 10/2019 | Freda | H04L 5/0055 |
| 2020/0146055 A1* | 5/2020 | Lei | H04W 74/0833 |
| 2021/0022189 A1* | 1/2021 | Beale | H04W 74/0866 |
| 2021/0329703 A1* | 10/2021 | Yang | H04L 5/0053 |

FOREIGN PATENT DOCUMENTS

| | | | | |
|---|---|---|---|---|
| CN | 110719650 A | 1/2020 | |
| CN | 110769516 A | 2/2020 | |
| WO | WO-2017173051 A1 * | 10/2017 | H04W 76/28 |
| WO | 2018171802 A1 | 9/2018 | |
| WO | 2020031758 A1 | 2/2020 | |
| WO | 2020032742 A1 | 2/2020 | |

OTHER PUBLICATIONS

CN202010171424.X First Search Report dated Mar. 5, 2022.

CN202010228744.4 Notification to Grant Patent Right for Invention dated Mar. 18, 2022.

CN202010228744.4 First Search Report dated Mar. 12, 2022.

ISR received in application No. PCT/CN2021/079669 dated Jun. 25, 2021.

Nokia, Nokia Shanghai Bell "On 2-step RACH Procedure" 3GPP TSG RAN WG1 #96bis R1-1904716, Mar. 30, 2019.

Intel Corporation "Remaining issues on PUSCH resource unit selection for 2-step RACH" 3GPP TSG RAN WG2 #108 R2-1914843, Nov. 7, 2019.

Ericsson, "Channel Structure for Two-Step RACH," 3GPP TSG-RAN WG1 Meeting #97, R1-1907752, Reno, USA (May 13-17, 2019).

ZTE Corporation, "Status Report to TSG," 3GPP TSG RAN meeting #86, RP-192414, Sitges, Spain (Dec. 9-12, 2019).

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network; NR; NR and NG-RAN Overall Description; Stage 2 (Release 16)," 3GPP TS 38.300 V16.0.0 (Dec. 2019).

Third Generation Partnership Project, "Technical Specification Group Radio Access Network; NR; Medium Access Control (MAC) protocol specification (Release 15)," 3GPP TS 38.321 V15.8.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

USER EQUIPMENT AND METHOD THEREOF FOR PERFORMING A RANDOM

CROSS-REFERENCE TO RELATED APPLICATION

This application is a continuation application of International Application No. PCT/CN2021/079669, filed Mar. 9, 2021, which claims the benefit of Chinese Patent Application Serial No. 202010171424.X, filed on Mar. 12, 2020, and the benefit of Chinese Patent Application Serial No. 202010228744.4, filed on Mar. 27, 2020, the full disclosure of which is incorporated herein by reference.

TECHNICAL FIELD

The present disclosure relates to transmission methods and devices in wireless communication systems, and in particular to a transmission scheme and device related to random access in wireless communications.

BACKGROUND

Application scenarios of future wireless communication systems are becoming increasingly diversified, and different application scenarios have different performance demands on systems. To meet different performance requirements of various application scenarios, the 3rd Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

To adapt to a variety of application scenarios and meet different requirements, a study item (SI) of NR Non-orthogonal Multiple Access (NoMA) was also approved at the 3GPP RAN #76th plenary. The SI was started from Release 16 and soon after its completion a WI was initiated to standardize relevant techniques. Following the NoMA SI, the WI of 2-step Random Access (2-step RACH) under NR was approved at the 3GPP RAN #82 plenary.

SUMMARY

NR Release-16 system introduces 2-Step Random Access (RA) procedure to meet the demand of fast access. A Message A (MsgA) of the 2-Step RA procedure comprises Random Access (RA) Preambles and Physical Uplink Shared Channel (PUSCH) payloads; herein, the RA preambles are transmitted on a RACH Occasion (RO), and the PUSCH payloads occupy a PUSCH Resource Unit (PRU) for transmission on a PUSCH Occasion (PO). The RA preambles and the PRUs in the MsgA are independently configured, part of which are invalid due to some resource conflicts. Association mapping between the RA preambles and the PRUs in the MsgA is determined in an implicit method, which results in that part of the RA preambles cannot be associated with corresponding PRUs. When a User Equipment (UE) always selects an RA preamble not associated with a PRU, then a PUSCH payload cannot be transmitted in the MsgA, resulting in that the UE actually works according to 4-step RA procedure. However, a Random Access Response (RAR) window in a 2-step RA procedure is generally longer than an RAR window in 4-step RA procedure. When the UE is configured as 2-step RA procedure, and selects a preamble not associated with a PRU, an access delay of the 2-step RA procedure is longer than an access delay of the 4-step RA procedure, so that the demand of normal access delay cannot be guaranteed. Furthermore, the UE monitors a MsgB in an RAR window, and a start position of the RAR window is determined according to the PRU in the MsgA, when an RA preamble selected by the UE is not associated with a PRU, the RAR window cannot determine the start position according to the PRU in the MsgA.

In view of the above problems, the present disclosure discloses an RAR response mechanism in RA procedure, which can ensure that when the UE selects an RA preamble not associated with a PRU, the performance of access delay can be comparable to the 4-step RACH. It should be noted that the embodiments in a UE in the present disclosure and characteristics of the embodiments may be applied to a base station if no conflict is incurred, and vice versa. And the embodiments in the present disclosure and the characteristics in the embodiments can be arbitrarily combined if there is no conflict. Furthermore, though originally targeted at Random Access, the present disclosure is also applicable to Beam Failure Recovery.

Furthermore, though originally targeted at Uplink, the present disclosure is also applicable to Sidelink. Though originally targeted at single-carrier communications, the present disclosure is also applicable to multicarrier communications. Though originally targeted at single-antenna communications, the present disclosure is also applicable to multi-antenna communications. Besides, the present disclosure is not only targeted at scenarios of terminals and base stations, but also at V2X scenarios, and communication scenarios between terminals and relays as well as between relays and base stations where similar technical effect can be achieved. Additionally, the adoption of a unified solution for various scenarios, including but not limited to V2X scenarios and communication scenarios between terminals and base stations, contributes to the reduction of hardware complexity and costs.

It should be noted that interpretations of the terminology in the present disclosure refer to definitions given in the 3GPP TS36 series, TS37 series and TS38 series, as well as definitions given in Institute of Electrical and Electronics Engineers (IEEE) protocol specifications.

The present disclosure provides a method in a first node for wireless communications, comprising:

receiving a first reference-signal-resource set;

selecting a first signature sequence out of a candidate sequence group in a first period, transmitting a first signature sequence on a first time-frequency resource block;

when the first signature sequence is associated with a shared channel resource unit in the first period, transmitting a first signal on the shared channel resource unit in the first period, monitoring a second signal in a first time window; and when the first signature sequence is not associated with any shared channel resource unit in the first period, monitoring a second signal in a second time window;

herein, measuring at the first reference-signal-resource set is used for determining a first channel quality; the first channel quality is not less than a first threshold; the phrase that the first channel quality is not less than a first threshold is used for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, a problem to be solved in the present disclosure is: when the NR system selects an RA preamble not associated with a PRU in the 2-step RA procedure, since an RAR window of the 2-step RA procedure is longer than an RAR window in the 4-step RA procedure, so that the access performance is seriously degraded.

In one embodiment, a method in the present disclosure is establishing an association between the first time window and the second time window.

In one embodiment, a method in the present disclosure is associating whether the first signature sequence is associated with a shared channel resource unit in the first period with an RAR window.

In one embodiment, a method in the present disclosure is that when the first signature sequence is not associated with a shared channel resource unit in the first period, an RAR window is a smaller value of an RAR window in the 2-step RA procedure and an RAR window in the 4-step RA procedure.

In one embodiment, the above method is characterized in that when the first node is configured as Type-2 Random Access Procedure, the performance of random access is not worse than Type-1 Random Access Procedure.

In one embodiment, the above method is advantageous in avoiding that the first node follows the 4-step RA procedure when selecting an RA preamble not associated with a shared channel resource unit, while the RAR window follows the 2-step RA time window, so as to ensure the demand of UE access delay.

According to one aspect of the present disclosure, the above method is characterized in comprising:

receiving a first signaling group, wherein the first signaling group is used for indicating the first time length and the second time length.

According to one aspect of the present disclosure, the above method is characterized in comprising:

receiving a second signaling group, wherein the second signaling group is used for indicating whether the first signature sequence is associated with a shared channel resource unit in the first period.

According to one aspect of the present disclosure, the method is characterized in that the first signature sequence is associated with a shared channel resource unit in the first period, and the shared channel resource unit in the first period is used for determining a start time of the first time window.

According to one aspect of the present disclosure, the method is characterized in that the first signature sequence is not associated with any shared channel resource unit in the first period, the first time-frequency resource block is used for determining a start time of the second time window.

According to one aspect of the present disclosure, the method is characterized in that the first time-frequency resource block is reserved for a second signature sequence, and the second signature sequence is associated with a second shared channel resource unit in the first period; the first signature sequence is not associated with any shared channel resource unit in the first period, and the second shared channel resource unit is used for determining a start time of the second time window.

According to one aspect of the present disclosure, the above method is characterized in that the second signal is used for determining whether the first signature sequence is correctly received.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:

transmitting a first reference-signal-resource set;

receiving a first signature sequence on a first time-frequency resource block;

when the first signature sequence is associated with a shared channel resource unit in the first period, receiving a first signal on the shared channel resource unit in the first period, transmitting a second signal in a first time window; and when the first signature sequence is not associated with any shared channel resource unit in the first period, transmitting a second signal in a second time window;

herein, measuring at the first reference-signal-resource set is used for determining a first channel quality; the first channel quality is not less than a first threshold; the phrase that the first channel quality is not less than a first threshold is used for determining a candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

According to one aspect of the present disclosure, the above method is characterized in comprising:

transmitting a first signaling group, wherein the first signaling group is used for indicating the first time length and the second time length.

According to one aspect of the present disclosure, the above method is characterized in comprising:

transmitting a second signaling group, wherein the second signaling group is used for indicating whether the first signature sequence is associated with a shared channel resource unit in the first period.

According to one aspect of the present disclosure, the method is characterized in that the first signature sequence is associated with a shared channel resource unit in the first period, and the shared channel resource unit in the first period is used for determining a start time of the first time window.

According to one aspect of the present disclosure, the method is characterized in that the first signature sequence is not associated with any shared channel resource unit in the first period, the first time-frequency resource block is used for determining a start time of the second time window.

According to one aspect of the present disclosure, the method is characterized in that the first time-frequency resource block is reserved for a second signature sequence, and the second signature sequence is associated with a second shared channel resource unit in the first period; the first signature sequence is not associated with any shared channel resource unit in the first period, and the second shared channel resource unit is used for determining a start time of the second time window.

According to one aspect of the present disclosure, the above method is characterized in that the second signal is used for indicating whether the first signature sequence is correctly received.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a first node for wireless communication, comprising:

a first receiver, receiving a first reference-signal-resource set;

a first transmitter, selecting a first signature sequence out of a candidate sequence group in a first period, transmitting a first signature sequence on a first time-frequency resource block;

when the first signature sequence is associated with a shared channel resource unit in the first period, the first transmitter transmitting a first signal on the shared channel resource unit in the first period, the first receiver monitoring a second signal in a first time window; and when the first signature sequence is not associated with any shared channel resource unit in the first period, the first receiver monitoring a second signal in a second time window;

herein, measuring at the first reference-signal-resource set is used for determining a first channel quality; the first channel quality is not less than a first threshold; the phrase that the first channel quality is not less than a first threshold is used for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

The present disclosure provides a second node for wireless communications, comprising:

a second transmitter, transmitting a first reference-signal-resource set;

a second receiver, receiving a first signature sequence on a first time-frequency resource block;

when the first signature sequence is associated with a shared channel resource unit in the first period, the second receiver receiving a first signal on the shared channel resource unit in the first period, the second transmitter transmitting a second signal in a first time window; and when the first signature sequence is not associated with any shared channel resource unit in the first period, the second transmitter transmitting a second signal in a second time window;

herein, measuring at the first reference-signal-resource set is used for determining a first channel quality; the first channel quality is not less than a first threshold; the phrase that the first channel quality is not less than a first threshold is used for determining a candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the present disclosure is advantageous in the following aspects:

a problem to be solved in the present disclosure is: when the NR system selects an RA preamble not associated with a PRU in the 2-step RA procedure, since an RAR window of the 2-step RA procedure is longer than an RAR window in the 4-step RA procedure, so that the access performance is seriously degraded.

The present disclosure establishes an association between the first time window and the second time window.

The present disclosure associated whether the first signature sequence is associated with a shared channel resource unit in the first period with an RAR window.

In the present disclosure, when the first signature sequence is not associated with a shared channel resource unit in the first period, an RAR window is a smaller value of an RAR window in a 2-step RA procedure and an RAR window in a 4-step RA procedure.

In the present disclosure, when the first node is configured as Type-2 Random Access Procedure, the performance of random access is not worse than Type-1 Random Access Procedure.

The present disclosure avoids that the first node follows 4-step RA procedure when selecting an RA preamble not associated with a shared channel resource unit, while the RAR window follows the 2-step RA time window, so as to ensure the demand of UE access delay.

The present disclosure provides a method in a first node for wireless communications, comprising:

transmitting a first message group in a first time-frequency resource set, the first message group comprising the first signature sequence; and monitoring a second message group in a first time window;

herein, the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, a problem needed to be solved in the present disclosure is: the NR system selects an RA preamble not associated with a PRU in the two-step RA procedure, and a starting position of an RAR window monitoring a MsgB cannot be determined.

In one embodiment, a method in the present disclosure is establishing an association between the first time window and the first reference shared channel resource unit.

In one embodiment, a method in the present disclosure is establishing an association between the first reference shared channel resource unit and time-frequency resources occupied by the first signature sequence.

In one embodiment, a method in the present disclosure is establishing an association between the first reference shared channel resource unit and the reference signature sequence.

In one embodiment, a method in the present disclosure is that when the first signature sequence is associated with a shared channel resource unit in the first period, the shared channel resource unit in the first period is used for determining a start of the first time window; when the first signature sequence is not associated with a shared channel resource unit in the first period, the first reference shared channel resource unit is used for determining a start of the first time window.

In one embodiment, the above method is characterized in that although the first signature sequence in MsgA is not associated with a shared channel resource unit in the first period, the start of the first time window can be determined by the first reference shared channel resource unit.

In one embodiment, the above method is advantageous in that the start of the first time window can be determined regardless of whether the first signature sequence is associated with a shared channel resource unit in the first period.

According to one aspect of the present disclosure, the above method is characterized in that the first time-frequency resource set comprises a first time-frequency resource block, and the first signature sequence is transmitted on the first time-frequency resource block; the first time-frequency resource block is reserved for multiple signature sequences, the multiple signature sequences comprises a target signature sequence group, and the target signature sequence group is associated with a first shared channel resource group in the first period; the first reference shared channel resource unit belongs to the first shared channel resource group.

According to one aspect of the present disclosure, the above method is characterized in that the first time-frequency resource set comprises a first time-frequency resource block, and the first signature sequence is transmitted on the first time-frequency resource block; the first time-frequency resource block is reserved for multiple signature sequences, and the multiple signature sequences comprises the first signature sequence and a reference signature sequence; the reference signature sequence is associated with the first reference shared channel resource unit.

According to one aspect of the present disclosure, the above method is characterized in comprising:

the first receiver, receiving first information;

herein, the first information indicates the first reference shared channel resource unit.

According to one aspect of the present disclosure, the above method is characterized in that a start of the first time window is a target multicarrier symbol; the target multicarrier symbol is a first multicarrier symbol of a positive integer number of multicarrier symbol(s) occupied by a target control channel resource set;

and the target control channel resource set is an earliest control channel resource set after the first reference shared channel resource unit.

According to one aspect of the present disclosure, the above method is characterized in comprising:

the first receiver, receiving a first signaling group; and the first receiver, receiving a second signaling group;

herein, the first signaling group is used for indicating a candidate sequence set in the first period, and the multiple signature sequences on the first time-frequency resource block belong to the candidate sequence set in the first period; the second signaling group is used for indicating a shared channel resource set in the first period, and the reference shared channel resource unit is a shared channel resource unit of a positive integer number of shared channel resource unit(s) comprised in the shared channel resource set; and the candidate sequence set in the first period and the shared channel resource set in the first period are used together for determining the target signature sequence group.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:

receiving a first message group in a first time-frequency resource set, the first message group comprising the first signature sequence; and transmitting a second message group in a first time window;

herein, the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

According to one aspect of the present disclosure, the above method is characterized in that the first time-frequency resource set comprises a first time-frequency resource block, and the first signature sequence is transmitted on the first time-frequency resource block; the first time-frequency resource block is reserved for multiple signature sequences, and the multiple signature sequences comprises a target signature sequence group, and the target signature sequence group is associated with a first shared channel resource group in the first period; the first reference shared channel resource unit belongs to the first shared channel resource group.

According to one aspect of the present disclosure, the above method is characterized in that the first time-frequency resource set comprises a first time-frequency resource block, and the first signature sequence is transmitted on the first time-frequency resource block; the first time-frequency resource block is reserved for multiple signature sequences, and the multiple signature sequences comprises the first signature sequence and a reference signature sequence; the reference signature sequence is associated with the first reference shared channel resource unit.

According to one aspect of the present disclosure, the above method is characterized in comprising:

transmitting first information;

herein, the first information indicates the first reference shared channel resource unit.

According to one aspect of the present disclosure, the above method is characterized in that a start of the first time window is a target multicarrier symbol; the target multicarrier symbol is a first multicarrier symbol of a positive integer number of multicarrier symbol(s) occupied by a target control channel resource set; and the target control channel resource set is an earliest control channel resource set after the first reference shared channel resource unit.

According to one aspect of the present disclosure, the above method is characterized in comprising:

transmitting a first signaling group; and transmitting a second signaling group;

herein, the first signaling group is used for indicating a candidate sequence set in the first period, and the multiple signature sequences on the first time-frequency resource block belong to the candidate sequence set in the first period; the second signaling group is used for indicating a shared channel resource set in the first period, and the reference shared channel resource unit is a shared channel resource unit of a positive integer number of shared channel resource unit(s) comprised in the shared channel resource set; and the candidate sequence set in the first period and the shared channel resource set in the first period are used together for determining the target signature sequence group.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a first node for wireless communication, comprising:

a first transmitter, transmitting a first message group in a first time-frequency resource set, the first message group comprising the first signature sequence; and a first receiver, monitoring a second message group in a first time window;

herein, the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

The present disclosure provides a second node for wireless communications, comprising:

a second receiver, receiving a first message group in a first time-frequency resource set, the first message group comprising the first signature sequence; and a second transmitter, transmitting a second message group in a first time window;

herein, the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the present disclosure is advantageous in the following aspects:

a problem to be solved in the present disclosure is: when the NR system selects an RA preamble not associated with a PRU in the 2-step RA procedure, a starting position of an RAR window monitoring a MsgB cannot be determined.

The present disclosure establishes an association between the first time window and the first reference shared channel resource unit.

The present disclosure establishes an association between the first reference shared channel resource unit and time-frequency resources occupied by the first signature sequence.

The present disclosure establishes an association between the first reference shared channel resource unit and the reference signature sequence.

In the present disclosure, when the first signature sequence is associated with a shared channel resource unit in the first period, the shared channel resource unit in the first period is used for determining a start of the first time window; when the first signature sequence is not associated with a shared channel resource unit in the first period, the first reference shared channel resource unit is used for determining a start of the first time window.

In the present disclosure, although the first signature sequence in MsgA is not associated with a shared channel resource unit in the first period, the start of the first time window can be determined by the first reference shared channel resource unit.

The present disclosure solves the problem of determining a start of the first time window regardless of whether the first signature sequence is associated with a shared channel resource unit in the first period.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
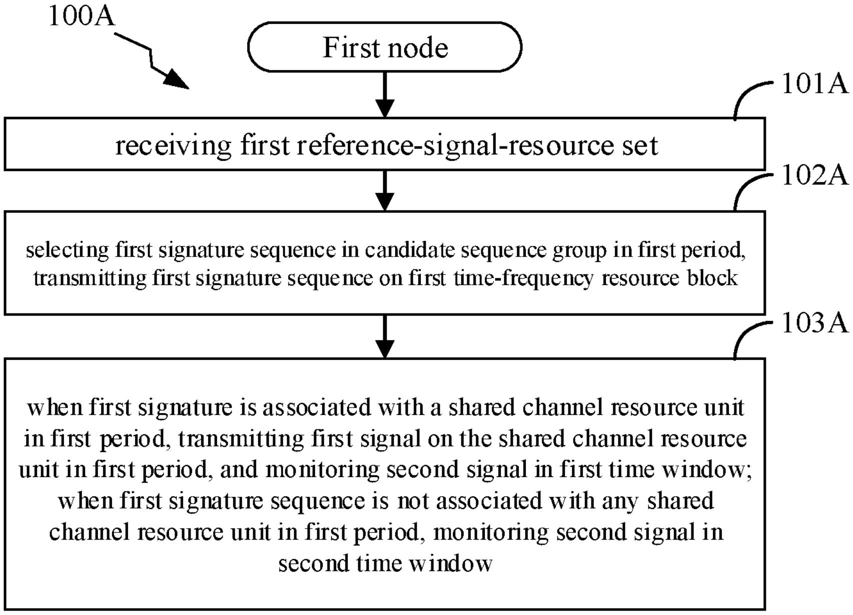
FIG. 1A illustrates a flowchart of the processing of a first node according to one embodiment of the present disclosure.
Figure 1B:
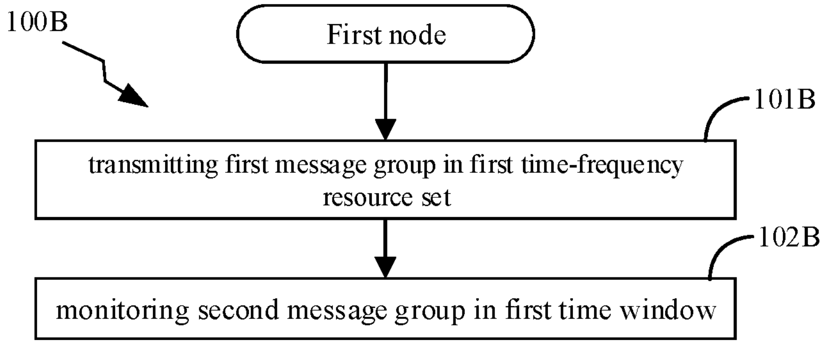
FIG. 1B illustrates a flowchart of the processing of a first node according to one embodiment of the present disclosure.

Embodiment 1A illustrates a flowchart of the processing of a first node according to one embodiment of the present disclosure, as shown in FIG. 1. In FIG. 1A, each block represents a step.

In Embodiment 1A, a first node in the present disclosure first receives a first reference-signal-resource set in step 101A; selects a first signature sequence out of a candidate sequence group in a first period in step 102A, and transmits the first signature sequence on a first time-frequency resource block; and finally in step 103A, when the first signature sequence is associated with a shared channel resource unit in the first period, transmits a first signal on the shared channel resource unit in the first period, monitors a second signal in a first time window; and when the first signature sequence is not associated with a shared channel resource unit in the first period, monitors a second signal in a second time window; measuring at the first reference-signal-resource set is used for determining a first channel quality; the first channel quality is not less than a first threshold; the phrase that the first channel quality is not less than a first threshold is used for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the first reference-signal-resource set comprises a positive integer number of first-type reference signal sequence(s).

In one embodiment, any of the positive integer number of first-type reference signal sequence(s) comprised in the first reference-signal-resource set is a Pseudo-Random Sequence.

In one embodiment, any of the positive integer number of first-type reference signal sequence(s) comprised in the first reference-signal-resource set is a Gold sequence.

In one embodiment, any of the positive integer number of first-type reference signal sequence(s) comprised in the first reference-signal-resource set is an M sequence.

In one embodiment, any of the positive integer number of first-type reference signal sequence(s) comprised in the first reference-signal-resource set is a Zadeoff-Chu (ZC) sequence.

In one embodiment, the first reference-signal-resource set comprises a positive integer number of reference signal resource block(s), and any of the positive integer number of reference signal resource block(s) comprised in the first reference-signal-resource set comprises a positive integer number of Resource Element(s)(RE(s)).

In one embodiment, an RE occupies a multicarrier symbol in time domain and a subcarrier in frequency domain.

In one embodiment, any of the positive integer number of reference signal resource block(s) comprised in the first reference-signal-resource set is used for transmitting a first-type reference signal in the positive integer number of reference signal(s) comprised in the first reference-signal-resource set.

In one embodiment, any of the positive integer number of first-type reference signal(s) comprised in the first reference-signal-resource set is mapped onto one of the positive integer number of reference signal resource block(s) comprised in the first reference-signal-resource set.

In one embodiment, the positive integer number of first-type reference signal(s) comprised in the first reference-signal-resource set acquires the first reference-signal-resource set respectively through Sequence Generation, Discrete Fourier Transform (DFT), Modulation and Resource Element Mapping, and Bandwidth Symbol Generation.

In one embodiment, the first reference-signal-resource set comprises a positive integer number of Channel State Information-Reference Signal (CSI-RS) resource(s).

In one embodiment, the first reference-signal-resource set comprises a positive integer number of periodic CSI-RS resource(s).

In one embodiment, the first reference-signal-resource set comprises a positive integer number of aperiodic CSI-RS resource(s).

In one embodiment, the positive integer number of reference signal resource block(s) comprised in the first reference-signal-resource set is(are respectively) a positive integer number of CSI-RS resource(s).

In one embodiment, the first reference-signal-resource set comprises a positive integer number of Synchronization Signal/Physical Broadcast Channel (SS/PBCH) Block(s).

In one embodiment, the first reference-signal-resource set comprises a positive integer number of Demodulation Reference Signal(s)(DMRS(s)).

In one embodiment, measuring at the first reference-signal-resource set comprises time-frequency tracking.

In one embodiment, measuring at the first reference-signal-resource set refers to a reception based on coherent detection, that is, the first node coherently receives a radio signal on the positive integer number of reference signal resource block(s) comprised in the first reference-signal-resource set with the positive integer number of first-type reference signal sequence(s) comprised in the first reference-signal-resource set, and measures energy of the signal acquired after the coherent reception.

In one embodiment, measuring at the first reference-signal-resource set refers to a reception based on coherent detection, that is, the first node coherently receives a radio signal on the positive integer number of reference signal resource block(s) comprised in the first reference-signal-resource set with the positive integer number of first-type reference signal sequence(s) comprised in the first reference-signal-resource set, and averages the received signal energy in time domain to acquire received power.

In one embodiment, measuring at the first reference-signal-resource set refers to a reception based on coherent detection, that is, the first node coherently receives a radio signal on the positive integer number of reference signal resource block(s) comprised in the first reference-signal-resource set with the positive integer number of first-type reference signal sequence(s) comprised in the first reference-signal-resource set, and averages the received signal energy in time domain and frequency domain to acquire received power.

In one embodiment, measuring at the first reference-signal-resource set refers to a reception based on energy detection, that is, the first node senses energy of a radio signal on the positive integer number of reference signal resource block(s) comprised in the first reference-signal-resource set and averages the energy in time to acquire signal strength.

In one embodiment, measuring at the first reference-signal-resource set refers to that the first node coherently receives a radio signal on the positive integer number of reference signal resource block(s) comprised in the first reference-signal-resource set with the positive integer number of first-type reference signal sequence(s) comprised in the first reference-signal-resource set to acquire channel quality on the positive integer number of reference signal resource block(s).

In one embodiment, measuring at the first reference-signal-resource set refers to a reception based on blind detection, that is, the first node receives a signal on the positive integer number of reference signal resource block(s) comprised in the first reference-signal-resource set and performs decoding operation, and determines whether the decoding is correct according to a CRC bit.

In one embodiment, the first channel quality comprises CSI.

In one embodiment, the first channel quality comprises a Reference Signal Receiving Power (RSRP).

In one embodiment, the first channel quality comprises channel quality over which the positive integer number of first-type reference signal(s) comprised in the first reference-signal-resource set is conveyed.

In one embodiment, the first channel quality comprises average received power of the positive integer number of first-type reference signal(s) comprised in the first reference-signal-resource set.

In one embodiment, the first channel quality comprises an average value of received power of the positive integer number of first-type reference signal(s) comprised in the first reference-signal-resource set on the positive integer number of reference signal resource block(s) comprised in the first reference-signal-resource set in time domain and frequency domain.

In one embodiment, the first channel quality comprises a Layer 1-RSRP (L1-RSRP) value.

In one embodiment, the first channel quality comprises a Layer 3-RSRP (L3-RSRP) value.

In one embodiment, the first channel quality comprises a Reference Signal Strength Indication (RSSI).

In one embodiment, the first channel quality comprises a Signal to Interference plus Noise Ratio (SINR) value.

In one embodiment, the first channel quality is measured by W.

In one embodiment, the first channel quality is measured by mW.

In one embodiment, the first channel quality is measured by dB.

In one embodiment, the first channel quality is measured by dBm.

In one embodiment, the first channel quality is not less than a first threshold.

In one embodiment, the first channel quality is greater than the first threshold.

In one embodiment, the first channel quality is equal to the first threshold.

In one embodiment, the first channel quality is greater than the first threshold.

In one embodiment, the first threshold is a rational number.

In one embodiment, the first threshold is fixed.

In one embodiment, the first threshold is configurable.

In one embodiment, the first threshold is a configured by a higher-layer signaling.

In one embodiment, the phrase that the first channel quality is not less than a first threshold is used for determining the candidate sequence group in the first period.

In one embodiment, the candidate sequence group is one of a first candidate sequence group or a second candidate sequence group.

In one embodiment, the first candidate sequence group comprises Q1 candidate sequence(s), the second candidate sequence group comprises Q2 candidate sequence(s), Q1 being a positive integer, Q2 being a positive integer.

In one embodiment, the Q1 candidate sequence(s) comprised in the first candidate sequence group is(are) Pseudo-Random sequence(s).

In one embodiment, the Q1 candidate sequence(s) comprised in the first candidate sequence group is(are) Gold sequence(s).

In one embodiment, the Q1 candidate sequence(s) comprised in the first candidate sequence group is(are) M sequence(s).

In one embodiment, the Q1 candidate sequence(s) comprised in the first candidate sequence group is(are) ZC sequence(s).

In one embodiment, the Q1 candidate sequence(s) comprised in the first candidate sequence group is(are) Preamble(s).

In one embodiment, the Q1 candidate sequence(s) comprised in the first candidate sequence group is(are) Random Access (RA) Preamble(s).

In one embodiment, the Q1 candidate sequence(s) comprised in the first candidate sequence group is(are) Physical Random Access Channel (PRACH) Preamble(s).

In one embodiment, the Q1 candidate sequence(s) comprised in the first candidate sequence group is(are) preamble(s) of Type-2 Random Access Procedure.

In one embodiment, the Q1 candidate sequence(s) comprised in the first candidate sequence group is(are) preamble(s) in a MsgA of Type-2 Random Access Procedure.

In one embodiment, the Q2 candidate sequence(s) comprised in the second candidate sequence group is(are) preamble(s) in a MsgA of 2-Step Random Access Procedure.

In one embodiment, the Q2 candidate sequence(s) comprised in the second candidate sequence group is(are) Pseudo-Random Sequence(s).

In one embodiment, the Q2 candidate sequence(s) comprised in the second candidate sequence group is(are) Gold Sequence(s).

In one embodiment, the Q2 candidate sequence(s) comprised in the second candidate sequence group is(are) M Sequence(s).

In one embodiment, the Q2 candidate sequence(s) comprised in the second candidate sequence group is(are) ZC Sequence(s).

In one embodiment, the Q2 candidate sequence(s) comprised in the second candidate sequence group is(are) Preamble(s).

In one embodiment, the Q2 candidate sequence(s) comprised in the second candidate sequence group is(are) RA Preamble(s).

In one embodiment, the Q2 candidate sequence(s) comprised in the second candidate sequence group is(are) PRACH Preamble(s).

In one embodiment, the Q2 candidate sequence(s) comprised in the second candidate sequence group is(are) preamble(s) of Type-1 Random Access Procedure.

In one embodiment, the Q2 candidate sequence(s) comprised in the second candidate sequence group is(are) preamble(s) in a Msg1 of Type-1 Random Access Procedure.

In one embodiment, the Q2 candidate sequence(s) comprised in the second candidate sequence group is(are) preamble(s) in a Msg1 of 4-Step Random Access Procedure.

In one embodiment, the first candidate sequence group is different from the second candidate sequence group.

In one embodiment, the first candidate sequence group is the same as the second candidate sequence group, and Q1 is equal to Q2.

In one embodiment, the candidate sequence group comprises Q candidate sequence(s), the first signature sequence is a candidate sequence of the Q candidate sequence(s) comprised in the candidate sequence group, Q being a positive integer.

In one embodiment, when the candidate sequence group is the first candidate sequence group, the Q candidate sequence(s) comprised in the candidate sequence group is(are respectively) the Q1 candidate sequence(s) comprised in the first candidate sequence group, Q being equal to the Q1.

In one embodiment, when the candidate sequence group is the second candidate sequence group, the Q candidate sequence(s) comprised in the candidate sequence group is(are respectively) the Q2 candidate sequence(s) comprised in the second candidate sequence group, Q being equal to the Q2.

In one embodiment, when the first channel quality is not less than the first threshold, the candidate sequence group is the first candidate sequence group.

In one embodiment, when the first channel quality is higher than the first threshold, the candidate sequence group is the first candidate sequence group.

In one embodiment, when the first channel quality is equal to the first threshold, the candidate sequence group is the first candidate sequence group.

In one embodiment, when the first channel quality is less than the first threshold, the candidate sequence group is the second candidate sequence group.

In one embodiment, when the first channel quality is equal to the first threshold, the candidate sequence group is the second candidate sequence group.

In one embodiment, the first period comprises a positive integer number of slot(s).

In one embodiment, the first period comprises multiple slots.

In one embodiment, the first period comprises one slot.

In one embodiment, the first period comprises a positive integer number of subframe(s).

In one embodiment, the first period comprises multiple subframes.

In one embodiment, the first period comprises one subframe.

In one embodiment, the first period comprises a positive integer number of radio frame(s).

In one embodiment, the first period comprises multiple radio subframes.

In one embodiment, the first period comprises one radio subframe.

In one embodiment, the first period is continuous in time.

In one embodiment, the first period comprises a positive integer number of SS/PBCH Block (SSB)-to-RO association pattern period(s).

In one embodiment, the first period comprises one SSB-to-RO association pattern period.

In one embodiment, the first period comprises a positive integer number of MsgA Association Period(s).

In one embodiment, the first period comprises one MsgA Association Period.

In one embodiment, the first period comprises a positive integer number of first-type time-frequency resource block(s), and any of the positive integer number of first-type time-frequency resource block(s) comprised in the first period comprises a PRACH.

In one embodiment, the first period comprises a positive integer number of first-type time-frequency resource block(s), and any of the positive integer number of first-type time-frequency resource block(s) comprised in the first period comprises a positive integer number of RE(s).

In one embodiment, the first period comprises a positive integer number of first-type time-frequency resource block(s), and any of the positive integer number of first-type time-frequency resource block(s) comprised in the first period comprises a positive integer number of multicarrier symbol(s) in time domain.

In one embodiment, the first period comprises a positive integer number of first-type time-frequency resource block(s), and any of the positive integer number of first-type time-frequency resource block(s) comprised in the first period comprises a positive integer number of multicarrier(s) in frequency domain.

In one embodiment, any of the positive integer number of multicarrier symbol(s) is an Orthogonal Frequency Division Multiplexing (OFDM) symbol.

In one embodiment, any of the positive integer number of multicarrier symbol(s) is a Single Carrier-Frequency Division Multiple Access (SC-FDMA) symbol.

In one embodiment, any of the positive integer number of multicarrier symbol(s) is a Discrete Fourier Transform Spread Orthogonal Frequency Division Multiplexing (DFT-S-OFDM) symbol.

In one embodiment, any of the positive integer number of multicarrier symbol(s) is a Frequency Division Multiple Access (FDMA) symbol.

In one embodiment, any of the positive integer number of multicarrier symbol(s) is a Filter Bank Multi-Carrier (FBMC) symbol.

In one embodiment, any of the positive integer number of multicarrier symbol(s) is an Interleaved Frequency Division Multiple Access (IFDMA) symbol.

In one embodiment, the positive integer number of first-type time-frequency resource block(s) comprised in the first period is Time Division Multiplexing (TDM).

In one embodiment, the positive integer number of first-type time-frequency resource block(s) comprised in the first period is Frequency Division Multiplexing (FDM).

In one embodiment, any two of the positive integer number of first-type time-frequency resource blocks comprised in the first period is one of TDM or FDM.

In one embodiment, at least two of the positive integer number of first-type time-frequency resource blocks comprised in the first period are TDM and FDM.

In one embodiment, any of the positive integer number of first-type time-frequency resource block(s) comprised in the first period comprises a positive integer number of RO(s).

In one embodiment, any of the positive integer number of first-type time-frequency resource block(s) comprised in the first period is an RO.

In one embodiment, any of the positive integer number of first-type time-frequency resource block(s) comprised in the first period comprises a positive integer number of PRACH Occasion(s)(PRO(s)).

In one embodiment, any of the positive integer number of first-type time-frequency resource block(s) comprised in the first period is a PRO.

In one embodiment, the positive integer number of first-type time-frequency resource block(s) comprised in the first period is(are) reserved for the candidate sequence group.

In one embodiment, the positive integer number of first-type time-frequency resource block(s) comprised in the first period is(are) reserved for the Q signature sequence(s) comprised in the candidate sequence group.

In one embodiment, the Q signature sequence(s) comprised in the candidate sequence group is(are) distributed in the positive integer number of first-type time-frequency resource block(s) comprised in the first period.

In one embodiment, the first time-frequency resource block is one of the positive integer number of first-type time-frequency resource block(s) comprised in the first period.

In one embodiment, the first time-frequency resource block comprises a PRACH.

In one embodiment, the first time-frequency resource block comprises a positive integer number of RE(s).

In one embodiment, the first time-frequency resource block is an RO.

In one embodiment, the first time-frequency resource block is a PRO.

In one embodiment, the first time-frequency resource block is reserved for Q0 candidate sequence(s) in the candidate sequence group, Q0 being not greater than the Q.

In one embodiment, the Q0 candidate sequence(s) in the candidate sequence group is(are) distributed in the first time-frequency resource block.

In one embodiment, the Q is a multiple of the Q0.

In one embodiment, the Q0 is equal to 64.

In one embodiment, the Q0 candidate sequences in the candidate sequence group are orthogonal.

In one embodiment, at least two candidate sequences in the Q0 candidate sequences in the candidate sequence group are generated by two different basic sequences.

In one embodiment, at least two candidate sequences in the Q0 candidate sequences in the candidate sequence group are generated by two cyclic shifts of a basic sequence.

In one embodiment, the first signature sequence is a candidate sequence of the Q candidate sequence(s) comprised in the candidate sequence group.

In one embodiment, the first signature sequence is a candidate sequence of the Q0 candidate sequence(s) comprised in the candidate sequence group.

In one embodiment, the first signature sequence is a PRACH preamble.

In one embodiment, the first signature sequence is a preamble of Type-2 Random Access Procedure.

In one embodiment, the first signature sequence is a preamble of 2-Step Random Access Procedure.

In one embodiment, the first signature sequence is selected by the first node itself out of the Q candidate sequence(s) in the candidate sequence group in the first period.

In one embodiment, the first signature sequence is randomly selected by the first node out of the Q candidate sequence(s) in the candidate sequence group in the first period.

In one embodiment, the first signature sequence is selected with medium probability out of the Q candidate sequence(s) comprised in the candidate sequence group in the first period.

In one embodiment, the first signature sequence is used for determining the first time-frequency resource block.

In one embodiment, the first time-frequency resource block is a first-type time-frequency resource block reserved for the Q0 candidate sequence(s) in the candidate sequence group of the positive integer number of first-type time-frequency resource block(s) comprised in the first period.

In one embodiment, the first time-frequency resource block is a first-type time-frequency resource block reserved for the first signature sequence of the positive integer number of first-type time-frequency resource block(s) comprised in the first period.

In one embodiment, the first time-frequency resource block is a first-type time-frequency resource block reserved for the Q0 candidate sequence(s) in the candidate sequence group of the positive integer number of first-type time-frequency resource block(s) comprised in the first period, and the first signature sequence is a candidate sequence in the Q0 candidate sequence(s) in the candidate sequence group.

In one embodiment, the first signature sequence is mapped onto the first time-frequency resource block after through DFT and then OFDM modulation.

Embodiment 1B

Embodiment 1B illustrates a flowchart of the processing of a first node according to one embodiment of the present disclosure, as shown in FIG. 1. In FIG. 1, each block represents a step.

In Embodiment 1B, a first node in the present disclosure first transmits a first message group in a first time-frequency resource set in step 101B; then in step 102B, monitors a second message group in a first time window; the first message group comprises the first signature sequence; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the first time-frequency resource set comprises multiple REs.

In one embodiment, an RE occupies a multicarrier symbol in time domain and a subcarrier in frequency domain.

In one embodiment, the first time-frequency resource set occupies a positive integer number of slot(s) in time domain.

In one embodiment, the first time-frequency resource set occupies a positive integer number of physical resource block(s) (PRB(s)) in the frequency domain.

In one embodiment, the first time-frequency resource set occupies a positive integer number of multicarrier symbol(s) in time domain.

In one embodiment, the first time-frequency resource set occupies a positive integer number of multicarrier(s) in frequency domain.

In one embodiment, the first time-frequency resource set comprises a first time-frequency resource block and the first shared channel resource unit.

In one embodiment, the first time-frequency resource set comprises a first time-frequency resource block in the first period and a shared channel resource unit in the first period.

In one embodiment, the first time-frequency resource set comprises a first time-frequency resource block in the first period and the first shared channel resource unit in the first period.

In one embodiment, the first time-frequency resource set comprises a first time-frequency resource block, and the first time-frequency resource set does not comprise any shared channel resource unit.

In one embodiment, the first time-frequency resource set comprises a first time-frequency resource block, and the first time-frequency resource set does not comprise any shared channel resource unit in the first period.

In one embodiment, the first time-frequency resource set comprises a PRACH and a PUSCH.

In one embodiment, the first time-frequency resource set comprises an RO and a PO.

In one embodiment, the first time-frequency resource set comprises a PRO and a PO.

In one embodiment, the first time-frequency resource set comprises a PRACH, and the first time-frequency resource set does not comprise a PUSCH.

In one embodiment, the first time-frequency resource set comprises an RO, and the first time-frequency resource set does not comprise any PO.

In one embodiment, the first time-frequency resource set comprises a PRO, and the first time-frequency resource set does not comprise any PO.

In one embodiment, when the first signature sequence is associated with a first shared channel resource unit in the first period, the first time-frequency resource set comprises the first time-frequency resource block and the first shared channel resource unit.

In one embodiment, when the first signature sequence is not associated with any shared channel resource unit in the first period, the first time-frequency resource set comprises a first time-frequency resource block, and the first time-frequency resource set does not comprise any shared channel resource unit in the first period.

In one embodiment, when the first signature sequence is associated with a first shared channel resource unit in the first period, the first time-frequency resource set comprises a PRACH and a PUSCH.

In one embodiment, when the first signature sequence is not associated with any shared channel resource unit in the first period, the first time-frequency resource set comprises a PRACH, and the first time-frequency resource set does not comprise a PUSCH.

In one embodiment, when the first signature sequence is associated with a first shared channel resource unit in the first period, the first time-frequency resource set comprises an RO and a PO.

In one embodiment, when the first signature sequence is not associated with any shared channel resource unit in the first period, the first time-frequency resource set comprises an RO, and the first time-frequency resource set does not comprise any PO.

In one embodiment, any of the positive integer number of multicarrier symbol(s) is an OFDM symbol.

In one embodiment, any of the multiple multicarrier symbols is an SC-FDMA symbol.

In one embodiment, any of the positive integer number of multicarrier symbol(s) is a DFT-S-OFDM symbol.

In one embodiment, any of the positive integer number of multicarrier symbol(s) is an FDMA symbol.

In one embodiment, any of the positive integer number of multicarrier symbol(s) is an FBMC symbol.

In one embodiment, any of the positive integer number of multicarrier symbol(s) is an IFDMA symbol.

In one embodiment, the first message group comprises the first signature sequence and the first sub-message.

In one embodiment, the first message group comprises the first signature sequence, and the first message group does not comprise the first sub-message.

In one embodiment, the first message group comprises the first signature sequence and the first sub-message, the first signature sequence is transmitted on the first time-frequency resource block, and the first sub-message is transmitted on the first shared channel resource unit in the first period.

In one embodiment, the first message group comprises the first signature sequence, the first message group does not comprise the first sub-message, and the first signature sequence is transmitted on the first time-frequency resource block.

In one embodiment, when the first signature sequence is associated with a first shared channel resource unit in the first period, the first message group comprises the first signature sequence and the first sub-message, the first signature sequence is transmitted on the first time-frequency resource block, and the first sub-message is transmitted on the first shared channel resource unit in the first period.

In one embodiment, when the first signature is not associated with any shared channel resource unit in the first period, the first message group comprises the first signature sequence, the first message group does not comprise the first sub-message, and the first signature sequence is transmitted on the first time-frequency resource block.

In one embodiment, when the first signature sequence is associated with a first shared channel resource unit in the first period, the first time-frequency resource set comprises the first time-frequency resource block and the first shared channel resource unit in the first period, the first message group comprises the first signature sequence and the first sub-message, the first signature sequence is transmitted on the first time-frequency resource block, and the first sub-message is transmitted on the first shared channel resource unit in the first period.

In one embodiment, when the first signature is not associated with any shared channel resource unit in the first period, the first time-frequency resource set comprises the first time-frequency resource block, the first time-frequency resource set does not comprises any shared channel resource unit in the first period, the first message group comprises the first signature sequence, the first message group does not comprise the first sub-message, and the first signature sequence is transmitted on the first time-frequency resource block.

In one embodiment, the first message group is a first message in Random Access Procedure.

In one embodiment, the first message group is a first message in 2-Step Random Access Procedure.

In one embodiment, the first message group is a MsgA in Type-2 L1 Random Access Procedure.

In one embodiment, the definition of the Type-2 L1 Random Access Procedure can be found in 3GPP TS38.213, section 8.

In one embodiment, the first message group comprises an RA Preamble on a PRACH in MsgA of Type-2 L1 Random Access Procedure and a PUSCH.

In one embodiment, the first message group only comprises a PRACH preamble in MsgA of Type-2 L1 Random Access Procedure.

In one embodiment, the first message group only comprises a PRACH preamble of Type-2 L1 Random Access Procedure, and the first message group does not comprise any PUSCH.

In one embodiment, the first signature sequence is a pseudo-random sequence.

In one embodiment, the first signature sequence is a Gold sequence.

In one embodiment, the first signature sequence is an M sequence.

In one embodiment, the first signature sequence is an ZC sequence.

In one embodiment, the first signature sequence is a PRACH preamble.

In one embodiment, the first signature is an RA preamble in MsgA of Type-2 L1 Random Access Procedure.

In one embodiment, the first signature sequence is a preamble of 2-Step Random Access Procedure.

In one embodiment, the first node selects the first signature sequence in a candidate sequence group in the first period, the candidate sequence group comprises multiple candidate sequences, and the first sequence is one of the multiple candidate sequences.

In one embodiment, the first signature sequence is selected by the first node itself out of the multiple candidate sequences in the candidate sequence group in the first period.

In one embodiment, the first signature sequence is randomly selected by the first node out of the multiple candidate sequences in the candidate sequence group in the first period.

In one embodiment, the first signature sequence is selected by the first node with medium probability out of the multiple candidate sequences in the candidate sequence group in the first period.

In one embodiment, the probability of any candidate sequence in the multiple candidate sequences comprised in the candidate sequence group being selected as the first signature sequence is the same.

In one embodiment, probabilities of at least two candidate sequences in the multiple candidate sequences comprised in the candidate sequence group being selected as the first signature sequence are different.

In one embodiment, the multiple candidate sequences comprised in the candidate sequence group are Pseudo-Random Sequences.

In one embodiment, the multiple candidate sequences comprised in the candidate sequence group are Gold Sequences.

In one embodiment, the multiple candidate sequences comprised in the candidate sequence group are M Sequences.

In one embodiment, the multiple candidate sequences comprised in the candidate sequence group are ZC Sequences.

In one embodiment, the multiple candidate sequences comprised in the candidate sequence group are PRACH preambles.

In one embodiment, the first time-frequency resource block is reserved for the candidate sequence group.

In one embodiment, the first time-frequency resource block is occupied by the first signature sequence.

In one embodiment, the first signature sequence is used for determining the first time-frequency resource block.

In one embodiment, the first signature sequence generates the first message group after through DFT and then OFDM modulation.

In one embodiment, the first signature sequence is mapped to the first time-frequency resource block after DFT and then OFDM modulation.

In one embodiment, the first sub-message is a baseband signal.

In one embodiment, the first sub-message is a radio-frequency signal.

In one embodiment, the first sub-message is a radio signal.

In one embodiment, the first sub-message is transmitted on an Uplink Shared Channel (UL-SCH).

In one embodiment, the first sub-message is transmitted on a PUSCH.

In one embodiment, the first sub-message is transmitted on the first time-frequency resource set.

In one embodiment, the first sub-message is transmitted on the first shared channel resource unit in the first period.

In one embodiment, the first sub-message comprises all or part of a higher-layer signaling.

In one embodiment, the first sub-message comprises all or part of a Radio Resource Control (RRC) layer signaling.

In one embodiment, the first sub-message comprises one or more Fields in an RRC Information Element (IE).

In one embodiment, the first sub-message comprises all or part of a Multimedia Access Control (MAC) layer signaling.

In one embodiment, the first sub-message comprises one or more fields in a MAC Control Element (CE).

In one embodiment, the sub-message comprises one or more fields of a PHY layer signaling.

In one embodiment, the first signature sequence is an RA preamble, and the first sub-message comprises RRC-connection related information.

In one embodiment, the first signature sequence is an RA preamble, and the first sub-message comprises small data.

In one embodiment, the first signature sequence is an RA preamble, and the first sub-message comprises Control-Plane (C-Plane) information.

In one embodiment, the first signature sequence is an RA preamble, and the first sub-message comprises User-Plane (U-Plane) information.

In one embodiment, the first signature sequence is an RA preamble, and the first sub-message comprises RRC Message.

In one embodiment, the first signature sequence is an RA preamble, and the first sub-message comprises a Non-Access Stratum (NAS) message.

In one embodiment, the first signature sequence is an RA preamble, and the first sub-message comprises Service Data Adaptation Protocol (SDAP) data.

In one embodiment, the first signature sequence is a PRACH preamble of MsgA in Type-2 L1 Random Access Procedure, and the first sub-message is a PUSCH payload of MsgA in Type-2 L1 Random Access Procedure.

In one embodiment, a channel occupied by the first signature sequence comprises a RACH, and a channel occupied by the first sub-message comprises a UL-SCH.

In one embodiment, a channel occupied by the first signature sequence comprises a PRACH, and a channel occupied by the first sub-message comprises a PUSCH.

In one embodiment, the RRC connection related information comprises at least one of RRC Connection Request, RRC Resume Request, RRC Resume Request1, RRC Reestablishment Request, RRC Reconfiguration Complete, RRC Handover Confirm or RRC Early Data Request.

In one embodiment, the RRC connection related information comprises at least one of RRC Connection Request, RRC Connection Resume Request, RRC Connection Reestablishment, RRC Handover Confirm, RRC Connection Reconfiguration Complete, RRC Early Data Request, RRC Setup Request, RRC Resume Request, RRC Resume Request1, RRC Reestablishment Request or RRC Reconfiguration Complete.

In one embodiment, a first bit block comprises a positive integer number of bit(s), and the first sub-message comprises all or part of bit(s) in the first bit block.

In one embodiment, a first bit block is used for generating the first sub-message, and the first bit block comprises a positive integer number of bit(s).

In one embodiment, the first bit block comprises a positive integer number of bit(s), and all or part of the positive integer number of bit(s) is(are) used for generating the first sub-message.

In one embodiment, the first bit block comprises one Codeword (CW).

In one embodiment, the first bit block comprises one Code Block (CB).

In one embodiment, the first bit block comprises one Code Block Group (CBG).

In one embodiment, the first bit block comprises one Transport Block (TB).

In one embodiment, the first sub-message is obtained after all or part of bits of the first bit block sequentially through transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation, Modulation and Upconversion.

In one embodiment, the first sub-message is an output after the first bit block sequentially through a modulation mapper, a layer mapper, precoding, a resource element mapper, and multi-carrier symbol generation.

In one embodiment, only the first bit block is used for generating the first sub-message.

In one embodiment, there exists a bit block other than the first bit block being used for generating the first sub-message.

In one embodiment, the first message group carries a first identity.

In one embodiment, the first signature sequence indicates the first identity.

In one embodiment, the first identity is an index of the first signature sequence among the multiple signature sequences comprised in the signature sequence group.

In one embodiment, the first identity is used for identifying the first node.

In one embodiment, the first sub-message carries the first identity.

In one embodiment, the first bit block in the first sub-message comprises the first identity.

In one embodiment, the first identity is used for scrambling the first sub-message.

In one embodiment, the first identity is a Random Access Preamble Identity (RAPID).

In one embodiment, the first identity is an Extended RAPID.

In one embodiment, the first identity is a Radio Network Temporary Identity (RNTI).

In one embodiment, the first identity is a Temporary Cell-RNTI (TC-RNTI).

In one embodiment, the first identity is a Cell-RNTI (C-RNTI).

In one embodiment, the first identity is a random number.

In one embodiment, the first identity is a Random Access-RNTI (RA-RNTI).

In one embodiment, the first identity is a Message B-RNTI (MsgB-RNTI).

In one embodiment, the first identity is a UE Contention Resolution Identity.

In one embodiment, the first identity is a positive integer.

In one embodiment, the first identity is a positive integer from 1 to 64.

In one embodiment, the first identity is a positive integer from 0 to 63.

In one embodiment, the first identity is a positive integer.

In one embodiment, the first identity comprises multiple bits.

In one embodiment, the first identity comprises 8 bits.

In one embodiment, the first message group carries a first identity and a second identity.

In one embodiment, the first identity carried by the first message group is a RAPID, and the second identity carried by the first message group is a UE Contention Resolution Identity.

In one embodiment, the first identity carried by the first message group is a MsgB-RNTI, and the second identity carried by the first message group is a UE Contention Resolution Identity.

In one embodiment, the first identity carried by the first message group is a MsgB-RNTI, and the second identity carried by the first message group is a RAPID.

In one embodiment, the first identity carried by the first message group is a RAPID, and the second identity carried by the first message group is a TC-RNTI.

In one embodiment, the first identity carried by the first message group is a RAPID, and the second identity carried by the first message group is a C-RNTI.

In one embodiment, the first signature sequence is used for indicating the first identity, and the second identity is used for scrambling the first sub-message.

In one embodiment, the first signature sequence is used for indicating the first identity, and the first bit block in the first sub-message comprises the second identity.

In one embodiment, the first signature sequence is used for indicating the first identity, and the first time-frequency resource set is used for determining the second identity.

In one embodiment, the second message group comprises a baseband signal.

In one embodiment, the second message group comprises a radio-frequency signal.

In one embodiment, the second message group comprises a radio signal.

In one embodiment, a channel occupied by the second message group comprises a Physical Downlink Control Channel (PDCCH).

In one embodiment, a channel occupied by the second message group comprises a PDCCH and a Physical Downlink Shared Channel (PDSCH).

In one embodiment, the second message group comprises Downlink Control Information (DCI).

In one embodiment, the second message group comprises an RAR.

In one embodiment, the second message group comprises a successRAR.

In one embodiment, the second message group comprises a fallbackRAR.

In one embodiment, the second message group comprises DCI and an RAR.

In one embodiment, the second message group comprises a Timing Advance Command.

In one embodiment, the second message group comprises an Uplink Grant.

In one embodiment, the second message group comprises a TC-RNTI.

In one embodiment, the first message group is a first message in random access procedure, and the second message group is a second message in random access procedure.

In one embodiment, the first message group is a MsgA in Type-2 L1 Random Access Procedure, and the second message group is a MsgB in Type-2 L1 Random Access Procedure.

In one embodiment, the second message group comprises all or part of a MAC layer signaling.

In one embodiment, the second message group comprises one or more fields in a MAC CE.

In one embodiment, the second message group comprises one or more fields in a MAC Protocol Data Unit (PDU).

In one embodiment, the second message group is a MAC PDU.

In one embodiment, the second message group is a MAC subPDU.

In one embodiment, the second message group comprises multiple MAC subPDUs.

In one embodiment, one MAC subPDU of the multiple MAC subPDUs comprised in the second message group comprises a MAC subheader.

In one embodiment, one MAC subPDU of the multiple MAC subPDUs comprised in the second message group comprises a MAC subheader and a MAC payload.

In one embodiment, one MAC subPDU of the multiple MAC subPDUs comprised in the second message group comprises a MAC subheader only carrying a Backkoff Indicator.

In one embodiment, at least one MAC subPDU of the multiple MAC subPDUs comprised in the second message group comprises a MAC subheader only carrying one first-type identity of a positive integer number of first-type identity(identities).

In one embodiment, at least one MAC subPDU of the multiple MAC subPDUs comprised in the second message group comprises a successRAR.

In one embodiment, at least one MAC subPDU of the multiple MAC subPDUs comprised in the second message group comprises a fallbackRAR.

In one embodiment, the second message group comprises all or part of a higher-layer signaling.

In one embodiment, the second message group comprises one or more fields in a PHY layer.

In one embodiment, the second message group comprises a response to the first message group.

In one embodiment, the second message group carries a first identity, and the first message group carries the first identity.

In one embodiment, the first identity is used for scrambling the second message group.

In one embodiment, the first identity carried by the second message group is RNTI.

In one embodiment, the first identity carried by the second message group is a MsgB-RNTI.

In one embodiment, the second message group carries a positive integer number of first-type identity(identities), the first message group carries the first identity, and the first identity is one of the positive integer number of first-type identity(identities).

In one embodiment, one of the positive integer number of first-type identity(identities) carried by the second message group is a RAPID.

In one embodiment, one of the positive integer number of first-type identity(identities) carried by the second message group is a TC-RNTI.

In one embodiment, the second message group carries a positive integer number of first-type identity(identities) and a positive integer number of second-type identity(identities).

In one embodiment, one of the positive integer number of first-type identity(identities) is a RAPID.

In one embodiment, one of the positive integer number of first-type identity(identities) is an Extended RAPID. pos In one embodiment, one of the positive integer number of first-type identity(identities) is used for identifying one signature sequence of multiple signature sequences on the first time-frequency resource block.

In one embodiment, one of the positive integer number of first-type identity(identities) is a TC-RNTI.

In one embodiment, one of the positive integer number of first-type identity(identities) is a C-RNTI.

In one embodiment, one of the positive integer number of first-type identity(identities) is a random number.

In one embodiment, one of the positive integer number of first-type identity(identities) is an RA-RNTI.

In one embodiment, one of the positive integer number of first-type identity(identities) is a MsgB-RNTI.

In one embodiment, one of the positive integer number of first-type identity(identities) is a UE Contention Resolution Identity.

In one embodiment, the second message group is used for indicating whether the first message group is correctly received.

In one embodiment, when the second message group carries the first identity and the second identity, the first message group is correctly received.

In one embodiment, when the second message group carries the first identity and the second identity, the first signature sequence in the first message group is correctly received.

In one embodiment, when the first identity is one of the positive integer number of first-type identity(identities) carried by the second message group, the first message group is correctly received.

In one embodiment, when the first identity is one of the positive integer number of first-type identity(identities) carried by the second message group, the first signature sequence in the first message group is correctly received.

In one embodiment, when the first identity is one of the positive integer number of first-type identity(identities) carried by the second message group, the first signature sequence in the first message group and the first sub-message are correctly received.

In one embodiment, when the second message group carries the first identity, and the second message group does not carry the second identity, the first message group is not correctly received.

In one embodiment, when the second message group carries the first identity, and the second message group does not carry the second identity, the first signature sequence in the first message group is not correctly received.

In one embodiment, when the second message group carries the first identity, and the second message group does not carry the second identity, the first signature sequence in the first message group is correctly received, and the first sub-message in the first message group is not correctly received.

In one embodiment, when the second message carries the positive integer number of first-type identity(identities), the first message group carries the first identity, the first identity is not any of the positive integer number of first-type identity(identities), and the first message group is not correctly received.

In one embodiment, when the second message carries the positive integer number of first-type identity(identities), the first message group carries the first identity, the first identity is not any of the positive integer number of first-type identity(identities), and the first signature sequence in the first message group is not correctly received.

In one embodiment, when the second message carries a positive integer number of first-type identity(identities), the first message group carries the first identity, the first identity is not any of the positive integer number of first-type identity(identities), and the first signature sequence in the first message group and the first sub-message are not correctly received.

In one embodiment, when the second message carries a positive integer number of first-type identity(identities), the first message group carries the first identity and the second identity, the first identity is not any of the positive integer number of first-type identity(identities), the second identity is not any of the positive integer number of first-type identity(identities), and the first message group is not correctly received.

In one embodiment, the being correctly received includes performing channel decoding on a radio signal, and a result of the performing channel decoding on a radio signal passes CRC check.

In one embodiment, the being correctly received includes performing energy detection on the radio signal in a duration, and an average value of a result of the performing energy detection on the radio signal in a duration exceeds a first given threshold.

In one embodiment, the being correctly received includes performing coherent detection on the radio signal, and signal energy acquired from the performing coherent detection on the radio signal exceeds a second given threshold.

In one embodiment, the first message group is correctly received includes a result of performing channel decoding on the first sub-message in the first message group passes CRC check, and the first bit block is used for generating the first sub-message.

In one embodiment, the first message group is correctly received includes performing coherent detection on the first signature sequence in the first message group, and signal energy acquired by performing coherent detection on the first signature sequence exceeds the second given threshold.

In one embodiment, the first message group is not correctly received includes a result of performing channel decoding on the first sub-message in the first message group does not pass CRC check, and the first bit block is used for generating the first sub-message.

In one embodiment, the first bit block is not correctly received includes performing coherent detection on the first signature sequence in the first message group, and signal energy acquired by performing coherent detection on the first signature sequence does not exceed the second given threshold.

In one embodiment, the channel decoding is based on Viterbi algorithm.

In one embodiment, the channel decoding is based on iteration.

In one embodiment, the channel decoding is based on Belief Propagation (BP) algorithm.

In one embodiment, the channel decoding is based on Log Likelihood Ratio (LLR)-BP algorithm.

In one embodiment, the monitoring refers to a blind detection-based reception, that is, the first node receives a signal in the first time window and performs decoding operation; when the decoding according to a CRC bit is correct, judges that the second message group is detected in the first time window; otherwise, judges that the second message group is not detected in the first time window.

In one embodiment, the monitoring refers to a coherent detection based reception, that is, the first node performs a coherent reception on a radio signal with an RS sequence corresponding to a DMRS of the second message group, and measures energy of a signal after the coherent reception; if the energy of the signal acquired after the coherent reception is greater than a first given threshold, judges that the second message group is detected in the first time window; otherwise, judges that the second message group is not detected in the first time window.

In one embodiment, the monitoring refers to an energy detection-based reception, that is, the first node senses energy of a radio signal in the first time window and averages it on time to obtain received energy; if the received energy is greater than a second given threshold, judges that the second message group is detected in the first time window; otherwise, judges that the second message group is not detected in the first time window.

In one embodiment, the second message group is detected refers to that after the second message group is received based on a blind detection, decoding is determined to be correct according to a CRC bit.

In one embodiment, when the second message group is detected in the first time window, the first signature sequence is correctly received.

In one embodiment, when the second message group is not detected in the first time window, the first signature sequence is not correctly received.

In one embodiment, when the second message group is not detected in the first time window, the first message group is not correctly received.

In one embodiment, when the second message group is detected in the first time window, the second message group does not comprise the first identity, and the first message group is not correctly received.

In one embodiment, the first period comprises a positive integer number of multi-carrier symbol(s).

In one embodiment, the first period comprises a positive integer number of slot(s).

In one embodiment, the first period comprises a positive integer number of subframe(s).

In one embodiment, the first period comprises a positive integer number of radio frame(s).

In one embodiment, the first period is continuous in time.

In one embodiment, the first period comprises a positive integer number of SSB-to-RO association pattern period(s).

In one embodiment, the first period comprises one SSB-to-RO association pattern period.

In one embodiment, the first period comprises a positive integer number of MsgA Association Period(s).

In one embodiment, the first period comprises one MsgA Association Period.

In one embodiment, the first time-frequency resource set belongs to the first period in time domain.

In one embodiment, the first period is a time when downlink synchronization and a broadcast signal maintain a mapping relation with a random access occasion.

In one embodiment, the first period is a time when a certain mapping relation is maintained between an RO and a shared channel resource unit.

In one embodiment, the first period comprises Nu shared channel resource unit(s), Nu being a positive integer.

In one embodiment, the first signature sequence is associated with a shared channel resource unit of the Nu shared channel resource unit(s) comprised in the first period.

In one embodiment, the first signature sequence is associated with a first shared channel resource unit in the first period, and the first shared channel resource unit is a shared channel resource unit of the Nu shared channel resource unit(s) in the first period.

In one embodiment, any shared channel resource unit in the Nu shared channel resource unit(s) comprised in the first period is associated with a candidate sequence in the candidate sequence group.

In one embodiment, the first signature sequence is not associated with any shared channel resource unit of the Nu shared channel resource unit(s) comprised in the first period.

In one embodiment, any shared channel resource unit of the Nu shared channel resource unit(s) comprised in the first period comprises multiple REs.

In one embodiment, any shared channel resource unit of the Nu shared channel resource unit(s) comprised in the first period is reserved for a PUSCH.

In one embodiment, any shared channel resource unit of the Nu shared channel resource unit(s) comprised in the first period is reserved for a UL-SCH.

In one embodiment, any shared channel resource unit in the Nu shared channel resource unit(s) comprised in the first period is reserved for random access.

In one embodiment, any shared channel resource unit in the Nu shared channel resource unit(s) comprised in the first period is reserved for a MsgA of 2-step random access.

In one embodiment, any shared channel resource unit in the Nu shared channel resource unit(s) comprised in the first period is reserved for a MsgA of Type-2 random access.

In one embodiment, any shared channel resource unit in the Nu shared channel resource unit(s) comprised in the first period is reserved for a PUSCH payload in a MsgA of Type-2 random access.

In one embodiment, the first period comprises a positive integer number of second-type time-frequency resource block(s), any of the positive integer number of second-type time-frequency resource block(s) comprised in the first period comprises a PUSCH.

In one embodiment, the first period comprises a positive integer number of second-type time-frequency resource block(s), and any of the positive integer number of second-type time-frequency resource block(s) comprised in the first period comprises a positive integer number of RE(s).

In one embodiment, the first period comprises a positive integer number of second-type time-frequency resource block(s), and any of the positive integer number of second-type time-frequency resource block(s) comprised in the first period comprises a positive integer number of multicarrier symbol(s) in time domain.

In one embodiment, the first period comprises a positive integer number of second-type time-frequency resource block(s), and any of the positive integer number of second-type time-frequency resource block(s) comprised in the first period comprises a positive integer number of multicarrier(s) in frequency domain.

In one embodiment, the positive integer number of second-type time-frequency resource block(s) comprised in the first period is(are) TDM.

In one embodiment, the positive integer number of second-type time-frequency resource block(s) comprised in the first period is(are) FDM.

In one embodiment, any two of the positive integer number of second-type time-frequency resource blocks comprised in the first period is one of TDM or FDM.

In one embodiment, at least two of the positive integer number of second-type time-frequency resource blocks comprised in the first period are TDM and FDM.

In one embodiment, any of the positive integer number of second-type time-frequency resource block(s) comprised in the first period comprises a positive integer number of PO(s).

In one embodiment, any of the positive integer number of second-type time-frequency resource block(s) comprised in the first period is a PO.

In one embodiment, a positive integer number of reference signal resource(s) is(are) configured for any of the positive integer number of second-type time-frequency resource block(s) comprised in the first period.

In one embodiment, any of the positive integer number of second-type time-frequency resource block(s) comprised in the first period is associated with a positive integer number of reference signal resource(s).

In one embodiment, a second time-frequency resource block is any of the positive integer number of second-type time-frequency resource block(s) comprised in the first period.

In one embodiment, a positive integer number of reference signal resource(s) is(are) configured for the second time-frequency resource block, and the positive integer number of shared channel resource unit(s) comprised in the second time-frequency resource block respectively corresponds(correspond) to the positive integer number of reference signal resource(s) on the second time-frequency resource block.

In one embodiment, the first period comprises the Nu shared channel resource unit(s), any shared channel resource unit of the Nu shared channel resource unit(s) comprised in the first period occupies a second-type time-frequency resource block in the first period, and adopts one of the positive integer number of reference signal resource(s) on the second-type time-frequency resource block.

In one embodiment, the first period comprises the Nu shared channel resource unit(s), any shared channel resource unit of the Nu shared channel resource unit(s) comprised in the first period is a combination of one of the positive integer number of second-type time-frequency resource block(s) comprised in the first period and a reference signal resource on the second-type time-frequency resource block.

In one embodiment, any shared channel resource unit of the Nu shared channel resource unit(s) comprised in the first period is a combination of one of the positive integer number of second-type time-frequency resource block(s) comprised in the first period and a reference signal resource of the positive integer number of reference signal resource(s) on the second-type time-frequency resource block.

In one embodiment, a first candidate shared channel resource unit and a second candidate shared channel resource unit are two of the positive integer number of shared channel resource units comprised in the second time-frequency resource block, the first candidate shared channel resource unit adopts a first reference signal resource on the second time-frequency resource block, and the second candidate shared channel resource unit adopts a second reference signal resource on the second time-frequency resource block.

In one embodiment, the second time-frequency resource block is associated with a positive integer number of reference signal resource(s), and the first reference signal resource and the second reference signal resource are two of the positive integer number of reference signal resources on the second time-frequency resource block.

In one embodiment, the positive integer number of reference signal resource(s) on the second time-frequency resource block is(are respectively) a positive integer number of Pseudo-Random Sequence(s).

In one embodiment, the positive integer number of reference signal resource(s) on the second time-frequency resource block is(are respectively) a positive integer number of Gold Sequence(s).

In one embodiment, the positive integer number of reference signal resource(s) on the second time-frequency resource block is(are respectively) a positive integer number of M Sequence(s).

In one embodiment, the positive integer number of reference signal resource(s) on the second time-frequency resource block is(are respectively) a positive integer number of ZC Sequence(s).

In one embodiment, the positive integer number of reference signal resource(s) on the second time-frequency resource block is(are respectively) a positive integer number of DMRS resource(s).

In one embodiment, the positive integer number of reference signal resource(s) on the second time-frequency resource block is(are respectively) a positive integer number of PUSCH DMRS resource(s).

In one embodiment, the positive integer number of reference signal resource(s) on the second time-frequency resource block is(are respectively) a positive integer number of Sounding Reference Signal (SRS) resource(s).

In one embodiment, a first shared channel resource unit is one of the positive integer number of shared channel resource unit(s) comprised in the second time-frequency resource block, and a first reference signal resource is one reference signal resource corresponding to the first shared channel resource unit of the positive integer number of reference signal resource(s) on the second time-frequency resource block; small-scale channel characteristics acquired through the first reference signal are used for demodulating a radio signal transmitted on the first shared channel resource unit.

In one embodiment, the Nu shared channel resource unit(s) comprised in the first period is(are) indicated by MsgA-PUSCH-config.

In one embodiment, the positive integer number of second-type time-frequency resource unit(s) comprised in the first period is(are) indicated by MsgA-PUSCH-config.

In one embodiment, the positive integer number of reference signal resource(s) on any of the positive integer number of second-type time-frequency resource block(s) comprised in the first period is(are) indicated by MsgA-DMRS-Configuration.

In one embodiment, the first signature sequence being associated with the first shared channel resource unit in the first period means that the first signature sequence is used for determining the first shared channel resource unit in the first period.

In one embodiment, the first signature sequence is used for determining time-frequency resources occupied by the first shared channel resource unit in the first period.

In one embodiment, the first signature sequence is used for determining the second time-frequency resource block in the first period.

In one embodiment, the first signature sequence is used for determining the first reference signal resource adopted by the first shared channel resource unit in the first period.

In one embodiment, an index of the first signature sequence in the candidate sequence group is used for determining the first shared channel resource unit in the first period.

In one embodiment, the first signature sequence being associated with the first shared channel resource unit in the first period means that the first message group comprises the first signature sequence and the first sub-message, and the first sub-message is transmitted on the first shared channel resource unit in the first period.

In one embodiment, the first signature sequence being not associated with any shared channel resource unit in the first period means that the first signature sequence is not used for determining any shared channel resource unit of the Nu shared channel resource unit(s) in the first period.

In one embodiment, the first signature sequence being not associated with any shared channel resource unit in the first period means that the first message group only comprises the first signature sequence, and the first signature sequence is transmitted on the first time-frequency resource block in the first time-frequency resource set.

In one embodiment, when the first signature sequence is not associated with any shared channel resource unit of the Nu shared channel resource unit(s) in the first period, transmission of the first sub-message is dropped before the first time window.

In one embodiment, transmission of the first sub-message is dropped before the first time window includes transmitting the first sub-message after the first time window.

In one embodiment, transmission of the first sub-message is dropped before the first time window includes dropping transmission of the first sub-message.

In one embodiment, the phrase of dropping transmission of the first sub-message means that transmit power of the first sub-message is 0.

In one embodiment, the phrase of dropping transmission of the first sub-message means that the first sub-message is not generated on a baseband.

In one embodiment, the first reference shared channel resource unit is any shared channel resource unit of the Nu shared channel resource unit(s) in the first period.

In one embodiment, the first reference shared channel resource unit belongs to the first period in time domain.

In one embodiment, time-frequency resources occupied by the first signature sequence are used for determining the first reference shared channel resource.

In one embodiment, the first time-frequency resource block is used for determining the first reference shared channel resource.

In one embodiment, an index of the first signature sequence in a candidate sequence group is used for determining the first reference shared channel resource.

Embodiment 2

Figure 2:
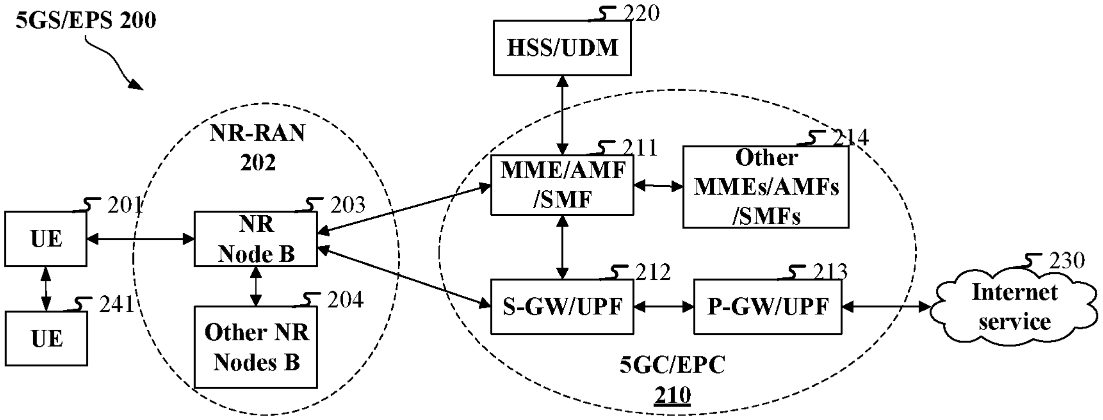
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, examples of gNB 203 include satellites, aircrafts or terrestrial base stations relayed by satellites. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the second node in the present disclosure comprises the gNB 203.

In one embodiment, the UE in the present disclosure comprises the UE 201.

In one embodiment, the base station in the present disclosure comprises the gNB 203.

In one embodiment, a receiver of the first reference-signal-resource set in the present disclosure comprises the UE 201.

In one embodiment, a transmitter of the first reference-signal-resource set in the present disclosure comprises the gNB 203.

In one embodiment, a transmitter of the first signature sequence in the present disclosure comprises the UE 201.

In one embodiment, a receiver of the first signature sequence in the present disclosure comprises the gNB 203.

In one embodiment, a receiver of the first signaling group in the present disclosure comprises the UE 201.

In one embodiment, a transmitter of the first signaling group in the present disclosure comprises the gNB 203.

In one embodiment, a receiver of the second signaling group in the present disclosure comprises the UE 201.

In one embodiment, a transmitter of the second signaling group in the present disclosure comprises the gNB 203.

In one embodiment, a transmitter of the first signal in the present disclosure comprises the UE 201.

In one embodiment, a receiver of the first signal comprises the gNB 203.

In one embodiment, a receiver of the second signal in the present disclosure comprises the UE 201.

In one embodiment, a transmitter of the second signal in the present disclosure comprises the gNB 203.

In one embodiment, a transmitter of the first message group in the present disclosure comprises the UE 201.

In one embodiment, a receiver of the first message group comprises the gNB 203.

In one embodiment, a receiver of the second message group in the present disclosure comprises the UE 201.

In one embodiment, a transmitter of the second message group in the present disclosure comprises the gNB 203.

In one embodiment, a receiver of the first information in the present disclosure comprises the UE 201.

In one embodiment, a transmitter of the first information in the present disclosure comprises the gNB 203.

Embodiment 3

Figure 3:
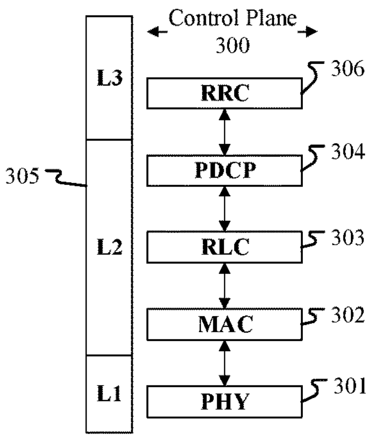
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also in charge of HARQ operation. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first reference-signal-resource set in the present disclosure is generated by the PHY 301.

In one embodiment, the first signature sequence in the present disclosure is generated by the PHY 301.

In one embodiment, the first signal in the present disclosure is generated by the RRC sublayer 306.

In one embodiment, the first signal in the present disclosure is transmitted to the PHY 301 via the MAC sublayer 302.

In one embodiment, the first signaling group in the present disclosure is generated by the RRC sublayer 306.

In one embodiment, the first signaling group in the present disclosure is transmitted to the PHY 301 via the MAC sublayer 302.

In one embodiment, the second signaling group in the present disclosure is generated by the RRC sublayer 306.

In one embodiment, the second signaling group in the present disclosure is transmitted to the PHY 301 via the MAC sublayer 302.

In one embodiment, the second signal in the present disclosure is generated by the MAC sublayer 302.

In one embodiment, the second signal in the present disclosure is transmitted to the PHY 301 via the MAC sublayer 302.

In one embodiment, the first message group in the present disclosure is generated by the PHY 301.

In one embodiment, the first message group in the present disclosure is generated by the PHY 301 and the RRC sublayer 306.

In one embodiment, the first sub-message in the present disclosure is generated by the RRC sublayer 306.

In one embodiment, the first sub-message in the present disclosure is transmitted to the PHY 301 via the MAC sublayer 302.

In one embodiment, the second message group in the present disclosure is generated by the MAC sublayer 302.

In one embodiment, the second message group in the present disclosure is transmitted to the PHY 301 via the MAC sublayer 302.

In one embodiment, the first information in the present disclosure is generated by the RRC sublayer 306.

In one embodiment, the first information in the present disclosure is generated by the PHY 301.

Embodiment 4

Figure 4:
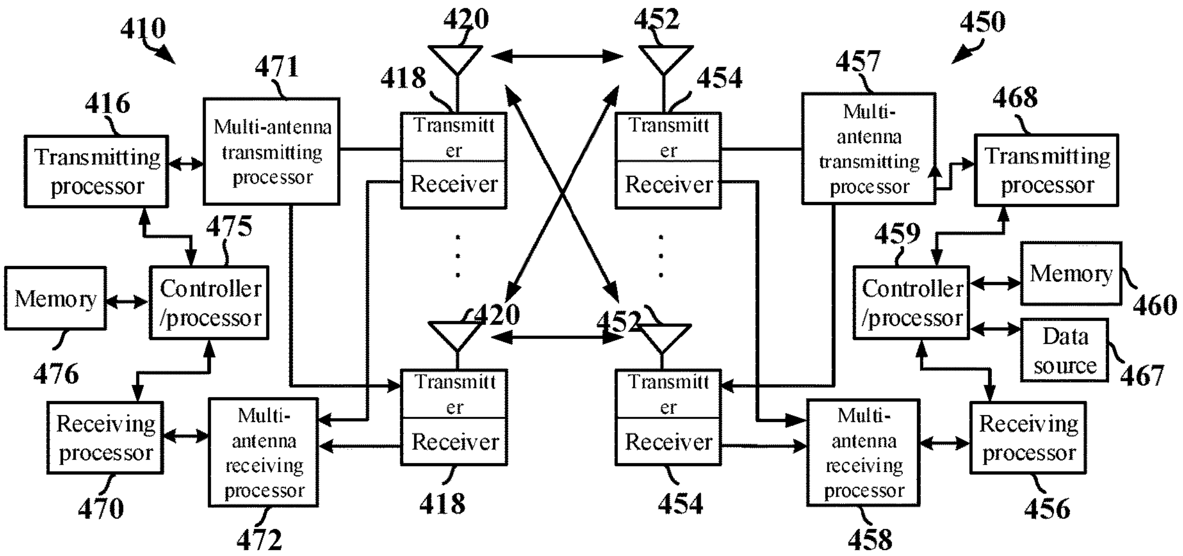
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a base station.

In one subembodiment of the above embodiment, the first node is a UE, and the second node is a relay node.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first reference-signal-resource set; selects a first signature sequence out of a candidate sequence group in a first period, transmits a first signature sequence on a first time-frequency resource block; when the first signature sequence is associated with a shared channel resource unit in the first period, transmits a first signal on the shared channel resource unit in the first period, monitors a second signal in a first time window; and when the first signature sequence is not associated with any shared channel resource unit in the first period, monitors a second signal in a second time window; measuring at the first reference-signal-resource set is used for determining a first channel quality; the first channel quality is not less than a first threshold; the phrase that the first channel quality is not less than a first threshold is used for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the second communication device 450 comprises a memory that stores a computer readable instruction program. The computer readable instruction program generates an action when executed by at least one processor. The action includes: receiving a first reference-signal-resource set; selecting a first signature sequence out of a candidate sequence group in a first period, transmitting a first signature sequence on a first time-frequency resource block; when the first signature sequence is associated with a shared channel resource unit in the first period, transmitting a first signal on the shared channel resource unit in the first period, monitoring a second signal in a first time window; and when the first signature sequence is not associated with any shared channel resource unit in the first period, monitoring a second signal in a second time window; measuring at the first reference-signal-resource set is used for determining a first channel quality; the first channel quality is not less than a first threshold; the phrase that the first channel quality is not less than a first threshold is used for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first reference-signal-resource set; receives a first signature sequence on a first time-frequency resource block; when the first signature sequence is associated with a shared channel resource unit in the first period, receives a first signal on the shared channel resource unit in the first period, transmits a second signal in a first time window; and when the first signature sequence is not associated with any shared channel resource unit in the first period, transmits a second signal in a second time window; measuring at the first reference-signal-resource set is used for determining a first channel quality; the first channel quality is not less than a first threshold; the phrase that the first channel quality is not less than a first threshold is used for determining a candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the first communication device 410 comprises a memory that stores a computer readable instruction program. The computer readable instruction program generates an action when executed by at least one processor. The action includes: transmitting a first reference-signal-resource set; receiving a first signature sequence on a first time-frequency resource block; when the first signature sequence is associated with a shared channel resource unit in the first period, receiving a first signal on the shared channel resource unit in the first period, transmitting a second signal in a first time window; and when the first signature sequence is not associated with any shared channel resource unit in the first period, transmitting a second signal in a second time window; measuring at the first reference-signal-resource set is used for determining a first channel quality; the first channel quality is not less than a first threshold; the phrase that the first channel quality is not less than a first threshold is used for determining a candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, at least one of the antenna 452, the receiver 454, the multi-antenna receiving processor 458, the receiving processor 456, the controller/processor 459, the memory 460, or the data source 467 is used to receive a first reference-signal-resource set in the present disclosure.

In one embodiment, at least one of the antenna 452, the receiver 454, the multi-antenna receiving processor 458, the receiving processor 456, the controller/processor 459, the memory 460, or the data source 467 is used to monitor a second signal in a first time window in the present disclosure.

In one embodiment, at least one of the antenna 452, the receiver 454, the multi-antenna receiving processor 458, the receiving processor 456, the controller/processor 459, the memory 460, or the data source 467 is used to monitor a second signal in a second time window in the present disclosure.

In one embodiment, at least one of the antenna 452, the receiver 454, the multi-antenna receiving processor 458, the receiving processor 456, the controller/processor 459, the memory 460, or the data source 467 is used to receive a first signaling group in the present disclosure.

In one embodiment, at least one of the antenna 452, the receiver 454, the multi-antenna receiving processor 458, the receiving processor 456, the controller/processor 459, the memory 460, or the data source 467 is used to receive a second signaling group in the present disclosure.

In one embodiment, at least one of the antenna 452, the transmitter 454, the multi-antenna transmission processor 458, the transmitting processor 468, the controller/processor 459, the memory 460, or the data source 467 is used to select a first signature sequence out of a candidate sequence group in a first period in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first signature sequence on a first time-frequency resource block in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first signal on a shared channel resource unit associated with the first signature sequence in the first period in the present disclosure.

In one embodiment, at least one of the antenna 420, the transmitter 418, the multi-antenna transmitting processor 471, the transmitting processor 416, the controller/processor 475, or the memory 476 is used to transmit a first reference-signal-resource set in the present disclosure.

In one embodiment, at least one of the antenna 420, the transmitter 418, the multi-antenna transmitting processor 471, the transmitting processor 416, the controller/processor 475, or the memory 476 is used to transmit a second signal in a first time window in the present disclosure.

In one embodiment, at least one of the antenna 420, the transmitter 418, the multi-antenna transmitting processor 471, the transmitting processor 416, the controller/processor 475, or the memory 476 is used to transmit a second signal in a second time window in the present disclosure.

In one embodiment, at least one of the antenna 420, the transmitter 418, the multi-antenna transmitting processor 471, the transmitting processor 416, the controller/processor 475, or the memory 476 is used to transmit a first signaling group in the present disclosure.

In one embodiment, at least one of the antenna 420, the transmitter 418, the multi-antenna transmitting processor 471, the transmitting processor 416, the controller/processor 475, or the memory 476 is used to transmit a second signaling group in the present disclosure.

In one embodiment, at least one of the antenna 420, the receiver 418, the multi-antenna receiving processor 472, the receiving processor 470, the controller/processor 475, or the memory 476 is used to receive a first signature sequence on a first time-frequency resource block in the present disclosure.

In one embodiment, at least one of the antenna 420, the receiver 418, the multi-antenna receiving processor 472, the receiving processor 470, the controller/processor 475, or the memory 476 is used to receive a second signal on a shared channel resource unit associated with the first signature sequence in a first period in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: transmits a first message group in a first time-frequency resource set, the first message group comprises the first signature sequence; monitors a second message group in a first time window; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the second communication device 450 comprises a memory that stores a computer readable instruction program. The computer readable instruction program generates an action when executed by at least one processor. The action includes: transmitting a first message group in a first time-frequency resource set, the first message group comprising the first signature sequence; and monitoring a second message group in a first time window; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives a first message group in a first time-frequency resource set, the first message group comprises the first signature sequence; transmits a second message group in a first time window; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the first communication device 410 comprises a memory that stores a computer readable instruction program. The computer readable instruction program generates an action when executed by at least one processor. The action includes: receiving a first message group in a first time-frequency resource set, the first message group comprising the first signature sequence; and transmitting a second message group in a first time window; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, at least one of the antenna 452, the transmitter 454, the multi-antenna transmission processor 458, the transmitting processor 468, the controller/processor 459, the memory 460, or the data source 467 is used to transmit a first message group in a first time-frequency resource set in the present disclosure.

In one embodiment, at least one of the antenna 452, the receiver 454, the multi-antenna receiving processor 458, the receiving processor 456, the controller/processor 459, the memory 460, or the data source 467 is used to monitor a second message group in a first time window in the present disclosure.

In one embodiment, at least one of the antenna 452, the receiver 454, the multi-antenna receiving processor 458, the receiving processor 456, the controller/processor 459, the memory 460, or the data source 467 is used to receive first information in the present disclosure.

In one embodiment, at least one of the antenna 452, the receiver 454, the multi-antenna receiving processor 458, the receiving processor 456, the controller/processor 459, the memory 460, or the data source 467 is used to receive a first signaling group in the present disclosure.

In one embodiment, at least one of the antenna 452, the receiver 454, the multi-antenna receiving processor 458, the receiving processor 456, the controller/processor 459, the memory 460, or the data source 467 is used to receive a second signaling group in the present disclosure.

In one embodiment, at least one of the antenna 420, the receiver 418, the multi-antenna receiving processor 472, the receiving processor 470, the controller/processor 475, or the memory 476 is used to receive a first message group in a first time-frequency resource set in the present disclosure.

In one embodiment, at least one of the antenna 420, the transmitter 418, the multi-antenna transmitting processor 471, the transmitting processor 416, the controller/processor 475, or the memory 476 is used to transmit a second message group in a first time window in the present disclosure.

In one embodiment, at least one of the antenna 420, the transmitter 418, the multi-antenna transmitting processor 471, the transmitting processor 416, the controller/processor 475, or the memory 476 is used to transmit first information in the present disclosure.

In one embodiment, at least one of the antenna 420, the transmitter 418, the multi-antenna transmitting processor 471, the transmitting processor 416, the controller/processor 475, or the memory 476 is used to transmit a first signaling group in the present disclosure.

In one embodiment, at least one of the antenna 420, the transmitter 418, the multi-antenna transmitting processor 471, the transmitting processor 416, the controller/processor 475, or the memory 476 is used to transmit a second signaling group in the present disclosure.

Embodiment 5A

Figure 5A:
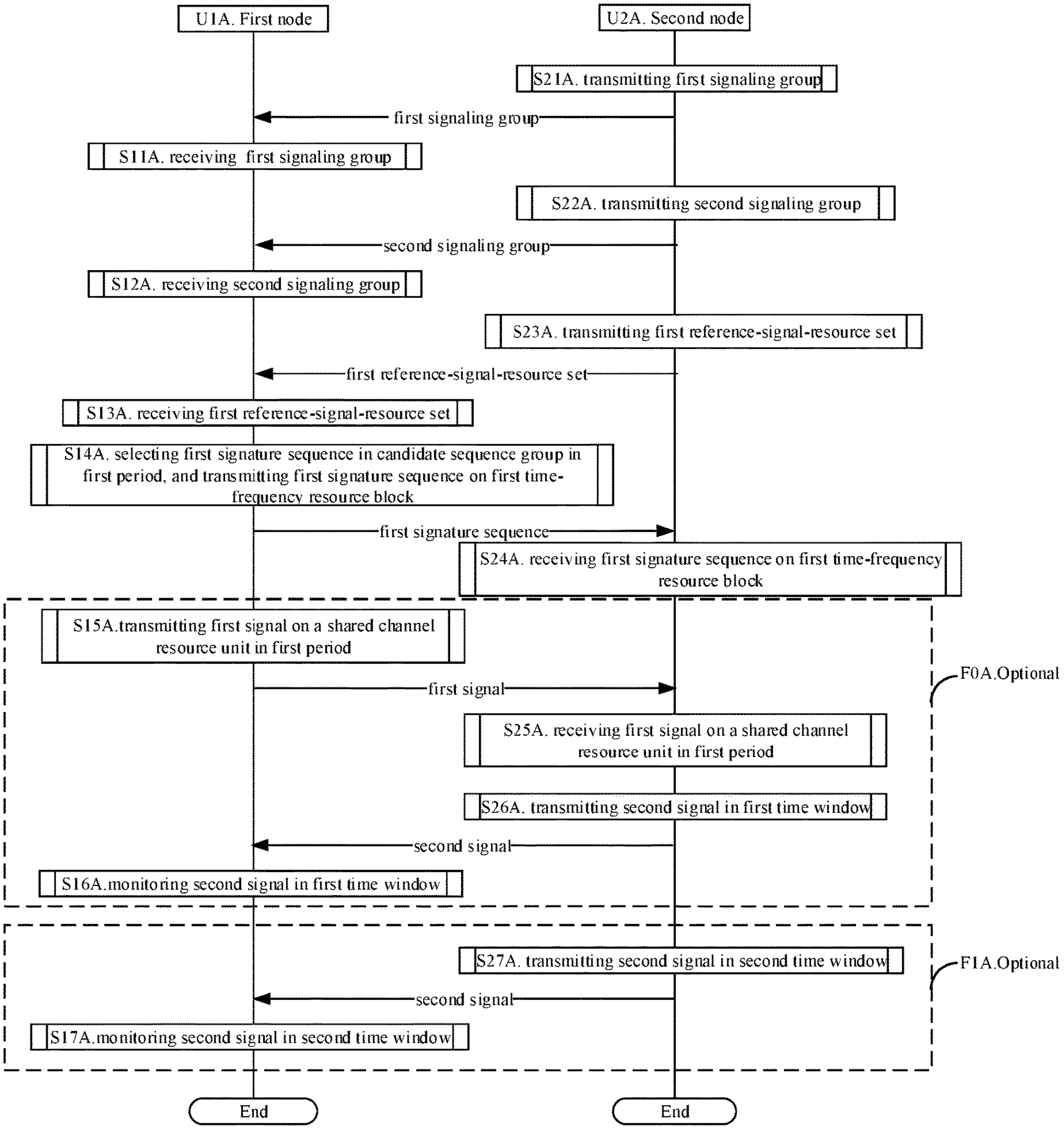
FIG. 5A illustrates a flowchart of radio signal transmission according to one embodiment of the present disclosure.

Embodiment 5A illustrates a flowchart of radio signal transmission according to one embodiment in the present disclosure, as shown in FIG. 5A. In FIG. 5A, a first node U1A and a second node U2A are in communications via an air interface. Steps in dotted boxes F0A and F1A in FIG. 5A are respectively optional.

The first node U1A receives a first signaling group in step S11A; receives a second signaling group in step S12A; receives a first reference-signal-resource set in step S13A; selects a first signature feature out of a candidate sequence group in a first period in step S14A, transmits a first signature sequence on a first time-frequency resource block; when the first signature sequence is associated with a shared channel resource unit in the first period, transmits a first signal on the shared channel resource unit in the first period in step S15A, monitors a second signal in a first time window in step S16A; when the first signature sequence is not associated with any shared channel resource unit in the first period, monitors a second signal in a second time window in step S17A.

The second node U2A transmits a first signaling group in step S21A; transmits a second signaling group in step S22A; transmits a first reference-signal-resource set in step S23A; receives a first signature sequence on a first time-frequency resource block in step S24A; when the first signature sequence is associated with a shared channel resource unit in the first period, receives a first signal on the shared channel resource unit in the first period in step S25A, and transmits a second signal in a first time window in step S26A; when the first signature sequence is not associated with any shared channel resource unit in the first period, transmits a second signal in a second time window in step S27A.

In Embodiment 5A, measuring at the first reference-signal-resource set is used by the first node U1A for determining a first channel quality; the first channel quality is not less than a first threshold; the phrase that the first channel quality is not less than a first threshold is used by first node U1A for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length; the first signaling group is used for indicating the first time length and the second time length; the second signaling group is used for indicating whether the first signature sequence is associated with a shared channel resource unit in the first period; and the second signal is used by the first node U1A for determining whether the first signature sequence is correctly received.

In one embodiment, the first signature sequence is associated with a shared channel resource unit in the first period, and the shared channel resource unit in the first period is used for determining a start time of the first time window.

In one embodiment, the first signature sequence is not associated with any shared channel resource unit in the first period, the first time-frequency resource block is used for determining a start time of the second time window.

In one embodiment, when the first signature sequence is not associated with any shared channel resource unit in the first period, the first time-frequency resource block is reserved for a second signature sequence, and the second signature sequence is associated with a second shared channel resource unit in the first period; the second shared channel resource unit is used for determining a start time of the second time window.

In one embodiment, steps in box F0A in FIG. 5A exist, and steps in box F1A in FIG. 5A do not exist.

In one embodiment, steps in box F0A in FIG. 5A do not exist, and steps in box F1A in FIG. 5A exist.

In one embodiment, when the first signature sequence is associated with a shared channel resource unit in the first period, steps in box F0A in FIG. 5A exist, and steps in box F1A in FIG. 5A do not exist.

In one embodiment, when the first signature sequence is not associated with any shared channel resource unit in the first period, steps in box F0A in FIG. 5A do not exist, and steps in box F1A in FIG. 5A exist.

In one embodiment, the first signaling group is broadcast.

In one embodiment, the first signaling group comprises a higher layer signaling.

In one embodiment, the first signaling group comprises a System Information Block (SIB).

In one embodiment, the first signaling group comprises a Master Information Block (MIB).

In one embodiment, the first signaling group comprises system information transmitted on a Broadcast Channel.

In one embodiment, the first signaling group comprises a positive integer number of first-type signaling(s).

In one embodiment, the positive integer number of first-type signaling(s) comprised in the first signaling group is(are) higher-layer signaling(s).

In one embodiment, the positive integer number of first-type signaling(s) comprised in the first signaling group is(are) RRC-layer signaling(s).

In one embodiment, at least one of the positive integer number of first-type signaling(s) comprised in the first signaling group is an RRC signaling.

In one embodiment, the positive integer number of first-type signaling(s) comprised in the first signaling group is(are respectively) one or more fields in a positive integer number of RRC IE(s).

In one embodiment, the positive integer number of first-type signaling(s) comprised in the first signaling group is(are respectively) a positive integer number of field(s) in an RRC IE.

In one embodiment, the first signaling group is used for indicating an RA preamble parameter.

In one embodiment, the first signaling group comprises a configuration parameter transmitted by a PRACH.

In one embodiment, the first signaling group comprises a Cell-specific random access parameter.

In one embodiment, the first signaling group comprises RRC IE RACH-ConfigGeneric.

In one embodiment, the definition of the RRC IE RACH-ConfigGeneric can be found in 3GPP TS38.331, section 6.3.2.

In one embodiment, the first signaling group comprises an ra-ResponseWindow.

In one embodiment, the definition of the ra-ResponseWindow can be found in 3GPP TS38.331, section 6.3.2.

In one embodiment, the first signaling group comprises RRC IE RACH-ConfigCommon.

In one embodiment, the definition of RRC IE RACH-ConfigCommon can be found in 3GPP TS38.331, section 6.3.2.

In one embodiment, the first signaling group indicates the positive integer number of first-type time-frequency resource block(s) in the first period.

In one embodiment, the second signaling group is broadcast.

In one embodiment, the second signaling group comprises a higher layer signaling.

In one embodiment, the second signaling group comprises an SIB.

In one embodiment, the second signaling group comprises an MIB.

In one embodiment, the second signaling group comprises system information transmitted on a Broadcast Channel (BCH).

In one embodiment, the second signaling group comprises a positive integer number of second-type signaling(s).

In one embodiment, the positive integer number of second-type signaling(s) comprised the second signaling group is(are) higher-layer signaling(s).

In one embodiment, the positive integer number of second-type signaling(s) comprised the second signaling group is(are) RRC-layer signaling(s).

In one embodiment, at least one of the positive integer number of second-type signaling(s) comprised the second signaling group is an RRC-layer signaling.

In one embodiment, the positive integer number of second-type signaling(s) comprised the second signaling group is(are respectively) one or more fields in a positive integer number of RRC IE(s).

In one embodiment, the positive integer number of second-type signaling(s) comprised in the second signaling group is(are respectively) a positive integer number of field(s) in an RRC IE.

In one embodiment, the second signaling group is used for indicating an RA preamble parameter.

In one embodiment, the second signaling group comprises a configuration parameter transmitted by a PRACH.

In one embodiment, the second signaling group comprises a Cell-specific random access parameter.

In one embodiment, the positive integer number of second-type signaling(s) in the second signaling group comprises(comprise) an RRC IE RACH-ConfigCommon.

In one embodiment, the definition of RRC IE RACH-ConfigCommon can be found in 3GPP TS38.331, section 6.3.2.

In one embodiment, the second signaling group comprises a PRACH preamble format.

In one embodiment, the second signaling group comprises time resources of a PRACH preamble.

In one embodiment, the second signaling group comprises frequency resources of a PRACH preamble.

In one embodiment, the second signaling group comprises root sequences and cyclic shifts of a PRACH preamble set.

In one embodiment, the second signaling group comprises at least one of an index in a logical root sequence table, a cyclic shift or a PRACH preamble set type of a PRACH preamble set.

In one embodiment, the second signaling group comprises a PRACH root sequence index.

In one embodiment, the second signaling group comprises a PRACH preamble subcarrier spacing.

In one embodiment, the second signaling group comprises transmit power of a PRACH preamble.

In one embodiment, the second signaling group comprises PRACH resources.

In one embodiment, the second signaling group indicates a positive integer number of RO(s) in a first period.

In one embodiment, the positive integer number of RO(s) in the first period is(are respectively) a positive integer number of PRO(s) in the first period.

In one embodiment, the second signaling group indicates the positive integer number of time-frequency resource block(s) in the first period.

In one embodiment, the second signaling group indicates the positive integer number of first-type time-frequency resource block(s) in the first period and the positive integer number of second-type time-frequency resource block(s) in the first period.

In one embodiment, the second signaling group indicates the positive integer number of first-type time-frequency resource block(s) in the first period and Nu shared channel resource unit(s) in the first period.

In one embodiment, the second signaling group indicates a first time-frequency resource block in the first period.

In one embodiment, the second signaling group indicates the positive integer number of first-type time-frequency resource block(s) in the first period, and the first node selects the first time-frequency resource block by itself out of the positive integer number of first-type time-frequency resource block(s).

In one embodiment, the second signaling group indicates that any of the positive integer number of RO(s) in the first period is associated with a positive integer number of SS/PBCH block(s).

In one embodiment, the second signaling group indicates that at least one of the positive integer number of RO(s) in the first period is associated with a positive integer number of SS/PBCH block(s).

In one embodiment, the second signaling group indicates R Contention-based Preamble(s) corresponding to any of the positive integer number of SS/PBCH block(s) associated with any valid RO in the first period, R being a positive integer greater than 64.

In one embodiment, the second signaling group comprises an ssb-perRACH-OccasionAndCB-PreamblesPerSSB signaling.

In one embodiment, the definition of the ssb-perRACH-OccasionAndCB-PreamblesPerSSB can be found in 3GPP TS38.331, section 6.3.2.

In one embodiment, the second signaling group comprises MsgA-PUSCH-config.

In one embodiment, the definition of the MsgA-PUSCH-config can be found in 3GPP TS38.331.

In one embodiment, the second signaling group is used for indicating a downlink control channel.

In one embodiment, the second signaling group comprises Cell-specific PDCCH parameter configuration.

In one embodiment, the second signaling group comprises PDCCH-config.

In one embodiment, the definition of the PDCCH-config can be found in 3GPP TS38.331.

In one embodiment, when the first signature sequence is associated with a shared channel resource unit in the first period, the second signaling group explicitly indicates the shared channel resource unit in the present disclosure.

In one embodiment, when the first signature sequence is associated with a shared channel resource unit in the first period, the second signaling group implicitly indicates the shared channel resource unit in the present disclosure.

In one embodiment, the second signaling group is used for indicating time-frequency resources occupied by any candidate sequence in the candidate sequence group in the first period.

Embodiment 5B

Figure 5B:
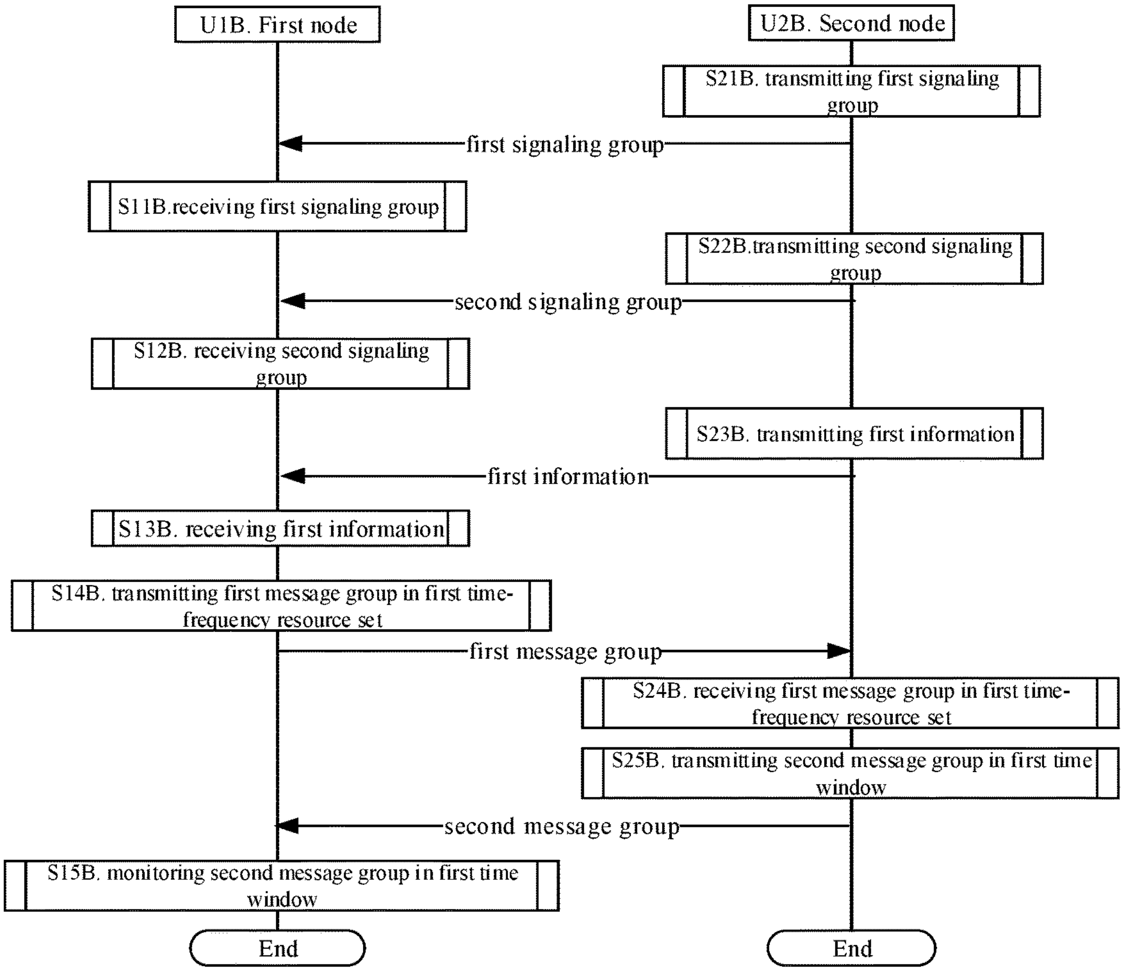
FIG. 5B illustrates a flowchart of radio signal transmission according to one embodiment of the present disclosure.

Embodiment 5B illustrates a flowchart of radio signal transmission according to one embodiment in the present disclosure, as shown in FIG. 5B. In FIG. 5B, a first node U1B and a second node U2B are in communications via an air interface.

The first node U1B receives a first signaling group in step S11B; receives a second signaling group in step S12B; receives first information in step S13B; transmits a first message group in a first time-frequency resource set in step S14B; and monitors a second message group in a first time window in step S15B.

The second node U2B transmits a first signaling group in step S21B; transmits a second signaling group in step S22B; transmits first information in step S23B; receives a first message group in a first time-frequency resource set in step S24B; and transmits a second message group in a first time window in step S25B.

In Embodiment 5B, the first message group comprises the first signature sequence; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window; the first time-frequency resource set comprises a first time-frequency resource block, and the first signature sequence is transmitted on the first time-frequency resource block; a start of the first time window is a target multicarrier symbol; the target multicarrier symbol is a first multicarrier symbol of a positive integer number of multicarrier symbol(s) occupied by a target control channel resource set; and the target control channel resource set is an earliest control channel resource set after the first reference shared channel resource unit; the first signaling group is used for indicating a candidate sequence set in the first period, and the multiple signature sequences on the first time-frequency resource block belong to the candidate sequence set in the first period; the second signaling group is used for indicating a shared channel resource set in the first period, and the reference shared channel resource unit is a shared channel resource unit of a positive integer number of shared channel resource unit(s) comprised by the shared channel resource set; and the candidate sequence set in the first period and the shared channel resource set in the first period are used together for determining the target signature sequence group.

In one embodiment, the first time-frequency resource block is reserved for multiple signature sequences, and the multiple signature sequences comprises a target signature sequence group, and the target signature sequence group is associated with a first shared channel resource group in the first period; the first reference shared channel resource unit belongs to the first shared channel resource group.

In one embodiment, the first time-frequency resource block is reserved for multiple signature sequences, and the multiple signature sequences comprises the first signature sequence and a reference signature sequence; the reference signature sequence is associated with the first reference shared channel resource unit.

In one embodiment, the first information indicates the first reference shared channel resource unit.

In one embodiment, the first signaling group comprises a higher layer signaling.

In one embodiment, the first signaling group comprises an SIB.

In one embodiment, the first signaling group comprises an MIB.

In one embodiment, the first signaling group comprises system information transmitted on a BCH.

In one embodiment, the first signaling group comprises a positive integer number of first-type signaling(s).

In one embodiment, the positive integer number of first-type signaling(s) comprised in the first signaling group is(are) higher-layer signaling(s).

In one embodiment, the positive integer number of first-type signaling(s) comprised in the first signaling group is(are) RRC-layer signaling(s).

In one embodiment, at least one of the positive integer number of first-type signaling(s) comprised in the first signaling group is an RRC signaling.

In one embodiment, the positive integer number of first-type signaling(s) comprised in the first signaling group is(are respectively) one or more fields in a positive integer number of RRC IE(s).

In one embodiment, the positive integer number of first-type signaling(s) comprised in the first signaling group is(are respectively) a positive integer number of field(s) in an RRC IE.

In one embodiment, the first signaling group is used for indicating an RA preamble parameter.

In one embodiment, the first signaling group comprises a configuration parameter transmitted by a PRACH.

In one embodiment, the first signaling group comprises a Cell-specific random access parameter.

In one embodiment, the first signaling group comprises RRC IE RACH-ConfigGeneric.

In one embodiment, the definition of the RRC IE RACH-ConfigGeneric can be found in 3GPP TS38.331, section 6.3.2.

In one embodiment, the first signaling group comprises an ra-ResponseWindow.

In one embodiment, the definition of the ra-ResponseWindow can be found in 3GPP TS38.331, section 6.3.2.

In one embodiment, the first signaling group comprises RRC IE RACH-ConfigCommon.

In one embodiment, the definition of RRC IE RACH-ConfigCommon can be found in 3GPP TS38.331, section 6.3.2.

In one embodiment, the first signaling group indicates the positive integer number of first-type time-frequency resource block(s) in the first period.

In one embodiment, the second signaling group comprises a higher layer signaling.

In one embodiment, the second signaling group comprises an SIB.

In one embodiment, the second signaling group comprises an MIB.

In one embodiment, the second signaling group comprises system information transmitted on a BCH.

In one embodiment, the second signaling group comprises a positive integer number of second-type signaling(s).

In one embodiment, the positive integer number of second-type signaling(s) comprised the second signaling group is(are) higher-layer signaling(s).

In one embodiment, the positive integer number of second-type signaling(s) comprised the second signaling group is(are) RRC-layer signaling(s).

In one embodiment, at least one of the positive integer number of second-type signaling(s) comprised the second signaling group is an RRC-layer signaling.

In one embodiment, the positive integer number of second-type signaling(s) comprised the second signaling group is(are respectively) one or more fields in a positive integer number of RRC IE(s).

In one embodiment, the positive integer number of second-type signaling(s) comprised in the second signaling group is(are respectively) a positive integer number of field(s) in an RRC IE.

In one embodiment, the second signaling group is used for indicating an RA preamble parameter.

In one embodiment, the second signaling group comprises a configuration parameter transmitted by a PRACH.

In one embodiment, the second signaling group comprises a Cell-specific random access parameter.

In one embodiment, the positive integer number of second-type signaling(s) in the second signaling group comprises(comprise) an RRC IE RACH-ConfigCommon.

In one embodiment, the definition of RRC IE RACH-ConfigCommon can be found in 3GPP TS38.331, section 6.3.2.

In one embodiment, the second signaling group comprises a PRACH preamble format.

In one embodiment, the second signaling group comprises time resources of a PRACH preamble.

In one embodiment, the second signaling group comprises frequency resources of a PRACH preamble.

In one embodiment, the second signaling group comprises root sequences and cyclic shifts of a PRACH preamble set.

In one embodiment, the second signaling group comprises at least one of an index in a logical root sequence table, a cyclic shift or a PRACH preamble set type of a PRACH preamble set.

In one embodiment, the second signaling group comprises a PRACH root sequence index.

In one embodiment, the second signaling group comprises a PRACH preamble subcarrier spacing.

In one embodiment, the second signaling group comprises transmit power of a PRACH preamble.

In one embodiment, the second signaling group comprises PRACH resources.

In one embodiment, the second signaling group indicates a positive integer number of RO(s) in a first period.

In one embodiment, the positive integer number of RO(s) in the first period is(are respectively) a positive integer number of PRO(s) in the first period.

In one embodiment, the second signaling group indicates the positive integer number of time-frequency resource block(s) in the first period.

In one embodiment, the second signaling group indicates the positive integer number of first-type time-frequency resource block(s) in the first period and the positive integer number of second-type time-frequency resource block(s) in the first period.

In one embodiment, the second signaling group indicates the positive integer number of first-type time-frequency resource block(s) in the first period and Nu shared channel resource unit(s) in the first period.

In one embodiment, the second signaling group indicates a first time-frequency resource block in the first period.

In one embodiment, the second signaling group indicates the positive integer number of first-type time-frequency resource block(s) in the first period, and the first node selects the first time-frequency resource block by itself out of the positive integer number of first-type time-frequency resource block(s).

In one embodiment, the second signaling group indicates that any of the positive integer number of RO(s) in the first period is associated with a positive integer number of SS/PBCH block(s).

In one embodiment, the second signaling group indicates that at least one of the positive integer number of RO(s) in the first period is associated with a positive integer number of SS/PBCH block(s).

In one embodiment, the second signaling group indicates R Contention-based Preamble(s) corresponding to any of the positive integer number of SS/PBCH block(s) associated with any valid RO in the first period, R being a positive integer greater than 64.

In one embodiment, the second signaling group comprises an ssb-perRACH-OccasionAndCB-PreamblesPerSSB signaling.

In one embodiment, the definition of the ssb-perRACH-OccasionAndCB-PreamblesPerSSB can be found in 3GPP TS38.331, section 6.3.2.

In one embodiment, the second signaling group comprises msgA-PUSCH-config.

In one embodiment, the definition of the msgA-PUSCH-config can be found in 3GPP TS38.331.

In one embodiment, the second signaling group is used for indicating a downlink control channel.

In one embodiment, the second signaling group comprises Cell-specific PDCCH parameter configuration.

In one embodiment, the second signaling group comprises PDCCH-config.

In one embodiment, the definition of the PDCCH-config can be found in 3GPP TS38.331.

In one embodiment, when the first signature sequence is associated with a shared channel resource unit in the first period, the second signaling group explicitly indicates the shared channel resource unit in the present disclosure.

In one embodiment, when the first signature sequence is associated with a shared channel resource unit in the first period, the second signaling group implicitly indicates the shared channel resource unit in the present disclosure.

In one embodiment, the second signaling group is used for indicating time-frequency resources occupied by any candidate sequence in the candidate sequence group in the first period.

In one embodiment, the first information comprises a higher-layer signaling.

In one embodiment, the first information comprises an SIB.

In one embodiment, the first information comprises an MIB.

In one embodiment, the first information comprises DCI.

In one embodiment, the first information indicates the first reference shared channel resource unit.

In one embodiment, the first information indicates an index of the first reference shared channel resource unit in the first shared channel resource group.

In one embodiment, the first information indicates the reference sequence, and the reference sequence is associated with the first reference shared channel resource unit. The first information indicates a time interval between the first reference shared channel resource unit and the first time-frequency resource block.

In one embodiment, the time interval between the first reference shared channel resource unit and the first time-frequency resource block comprises a positive integer number of slot(s).

In one embodiment, the time interval between the first reference shared channel resource unit and the first time-frequency resource block comprises a positive integer number of multicarrier symbol(s).

Embodiment 6A

Figure 6A:
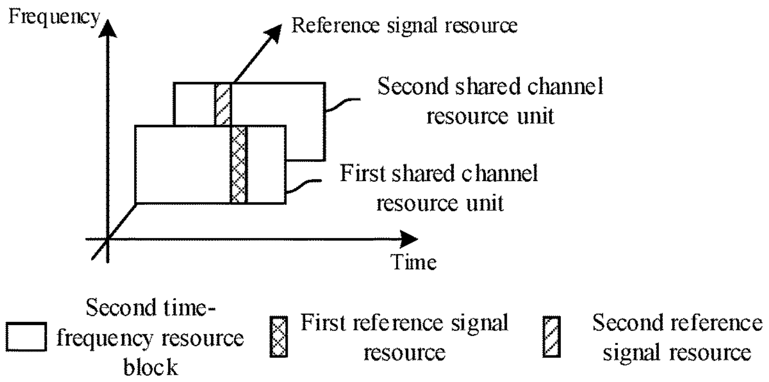
FIG. 6A illustrates a schematic diagram of a relation between a second time-frequency resource block and a shared channel resource unit according to one embodiment of the present disclosure.

Embodiment 6A illustrates a schematic diagram of a relation between a second time-frequency resource block and a shared channel resource unit according to one embodiment of the present disclosure, as shown in FIG. 6A. In FIG. 6A, the horizontal axis represents time, the vertical axis represents frequency, and the oblique axis represents reference signal resources; the box framed with thick solid lines represents a second time-frequency resource block in the present disclosure; the cross-line filled small rectangle represents a first reference signal resource in the present disclosure; the slash-line filled small rectangle represents a second reference signal resource in the present disclosure; in FIG. 6A, the box framed with thick solid lines carrying the cross-line filled rectangle represents a first shared channel resource unit in the present disclosure; the box framed with thick solid lines carrying the slash-filled rectangle represents a second shared channel resource unit in the present disclosure.

In Embodiment 6A, a first period comprises a positive integer number of second-type time-frequency resource block(s), a second time-frequency resource is any of the positive integer number of second-type time-frequency resource block(s) comprised in the first period, the second time-frequency resource block comprises a positive integer number of shared channel resource unit(s), and the positive integer number of shared channel resource unit(s) comprised in the second time-frequency resource block is(are) associated with a candidate sequence in a first candidate sequence group in the first period.

In one embodiment, the first period comprises Nu shared channel resource unit(s), Nu being a positive integer.

In one embodiment, the first signature sequence is associated with a shared channel resource unit in the first period.

In one embodiment, the first signature sequence is associated with a shared channel resource unit of the Nu shared channel resource unit(s) comprised in the first period.

In one embodiment, any shared channel resource unit in the Nu shared channel resource unit(s) comprised in the first period is associated with one candidate sequence in the candidate sequence group.

In one embodiment, the first signature sequence is not associated with any shared channel resource unit of the Nu shared channel resource unit(s) comprised in the first period.

In one embodiment, any shared channel resource unit in the Nu shared channel resource unit(s) comprised in the first period comprises multiple REs.

In one embodiment, any shared channel resource unit in the Nu shared channel resource unit(s) comprised in the first period is reserved for a PUSCH.

In one embodiment, any shared channel resource unit in the Nu shared channel resource unit(s) comprised in the first period is reserved for a UL-SCH.

In one embodiment, any shared channel resource unit in the Nu shared channel resource unit(s) comprised in the first period is reserved for random access.

In one embodiment, any shared channel resource unit in the Nu shared channel resource unit(s) comprised in the first period is reserved for MsgA of 2-step random access.

In one embodiment, any shared channel resource unit in the Nu shared channel resource unit(s) comprised in the first period is reserved for MsgA of Type-2 random access.

In one embodiment, any shared channel resource unit in the Nu shared channel resource unit(s) comprised in the first period is reserved for a PUSCH payload in MsgA of Type-2 random access.

In one embodiment, any of the positive integer number of second-type time-frequency resource block(s) comprised in the first period is configured as a positive integer number of reference signal resource(s).

In one embodiment, any of the positive integer number of second-type time-frequency resource block(s) comprised in the first period is associated with a positive integer number of reference signal resource(s).

In one embodiment, a positive integer number of reference signal resource(s) is(are) configured for the second time-frequency resource block, and the positive integer number of shared channel resource unit(s) comprised in the second time-frequency resource block respectively corresponds(correspond) to the positive integer number of reference signal resource(s) on the second time-frequency resource block.

In one embodiment, the first period comprises the Nu shared channel resource unit(s), any of the Nu shared channel resource unit(s) comprised in the first period occupies a second-type time-frequency resource block in the first period, and adopts one of the positive integer number of reference signal resource(s) on the second-type time-frequency resource block.

In one embodiment, the first period comprises the Nu shared channel resource unit(s), any shared channel resource unit of the Nu shared channel resource unit(s) comprised in the first period is a combination of one of the positive integer number of second-type time-frequency resource block(s) comprised in the first period and a reference signal resource on the second-type time-frequency resource block.

In one embodiment, any shared channel resource unit of the Nu shared channel resource unit(s) comprised in the first period is a combination of one of the positive integer number of second-type time-frequency resource block(s) comprised in the first period and one of the positive integer number of reference signal resource(s) on the second-type time-frequency resource block.

In one embodiment, a first shared channel resource unit and a second shared channel resource unit are two of the positive integer number of shared channel resource units comprised in the second time-frequency resource block, the first shared channel resource unit adopts a first reference signal resource on the second time-frequency resource block, and the second shared channel resource unit adopts a second reference signal resource on the second time-frequency resource block.

In one embodiment, the second time-frequency resource block is associated with a positive integer number of reference signal resource(s), and the first reference signal resource and the second reference signal resource are two of the positive integer number of reference signal resources on the second time-frequency resource block.

In one embodiment, the positive integer number of reference signal resource(s) on the second time-frequency resource block is(are respectively) a positive integer number of DMRS resource(s).

In one embodiment, the positive integer number of reference signal resource(s) on the second time-frequency resource block is(are respectively) a positive integer number of PUSCH DMRS resource(s).

In one embodiment, the positive integer number of reference signal resource(s) on the second time-frequency resource block is(are respectively) a positive integer number of SRS resource(s).

In one embodiment, a first target shared channel resource unit is one of the positive integer number of shared channel resource unit comprised in the second time-frequency resource block, and a first target reference signal is a reference signal resource corresponding to the target shared channel resource unit of the positive integer number of reference signal resource(s) on the second time-frequency resource block; small-scale channel characteristics acquired through the first target reference signal is used for demodulating a radio signal transmitted on the first target shared channel resource unit.

In one embodiment, the Nu shared channel resource unit(s) comprised in the first period is(are) indicated by msgA-PUSCH-config.

In one embodiment, the positive integer number of second-type time-frequency resource unit(s) comprised in the first period is(are) indicated by msgA-PUSCH-config.

In one embodiment, the positive integer number of reference signal resource(s) on any of the positive integer number of second-type time-frequency resource block(s) comprised in the first period is(are) indicated by msgA-DMRS-Configuration.

In one embodiment, the first period comprises a positive integer number of second-type time-frequency resource block(s), any of the positive integer number of second-type time-frequency resource block(s) comprised in the first period comprises a PUSCH.

In one embodiment, the first period comprises a positive integer number of second-type time-frequency resource block(s), and any of the positive integer number of second-type time-frequency resource block(s) comprised in the first period comprises a positive integer number of RE(s).

In one embodiment, the first period comprises a positive integer number of second-type time-frequency resource block(s), and any of the positive integer number of second-type time-frequency resource block(s) comprised in the first period comprises a positive integer number of multicarrier symbol(s) in time domain.

In one embodiment, the first period comprises a positive integer number of second-type time-frequency resource block(s), and any of the positive integer number of second-type time-frequency resource block(s) comprised in the first period comprises a positive integer number of multicarrier(s) in frequency domain.

In one embodiment, the positive integer number of second-type time-frequency resource block(s) comprised in the first period is(are) TDM.

In one embodiment, the positive integer number of second-type time-frequency resource block(s) comprised in the first period is(are) FDM.

In one embodiment, any two of the positive integer number of second-type time-frequency resource blocks comprised in the first period is one of TDM or FDM.

In one embodiment, at least two of the positive integer number of second-type time-frequency resource blocks comprised in the first period are TDM and FDM.

In one embodiment, any of the positive integer number of second-type time-frequency resource block(s) comprised in the first period comprises a positive integer number of PO(s).

In one embodiment, any of the positive integer number of second-type time-frequency resource block(s) comprised in the first period is a PO.

Embodiment 6B

Figure 6B:
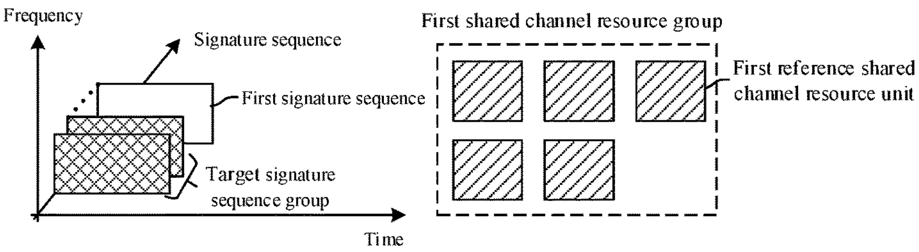
FIG. 6B illustrates a schematic diagram of relations among a first signature sequence, a target signature sequence group, a first shared channel resource group and a first reference shared channel resource unit according to one embodiment of the present disclosure.

Embodiment 6B illustrates a schematic diagram of relations among a first signature sequence, a target signature sequence group, a first shared channel resource group and a first reference shared channel resource unit according to one embodiment of the present disclosure, as shown in FIG. 6B. In FIG. 6B, the horizontal axis represents time, the vertical axis represents frequency, and the oblique axis represents a signature sequence; the crossline filled rectangle represents a signature sequence in a target signature sequence group in the present disclosure; the unfilled rectangle represents a first signature sequence in the present disclosure; and the rectangles in the dotted box represent a first shared channel resource group in the present disclosure.

In Embodiment 6B, the first time-frequency resource set comprises a first time-frequency resource block, and the first signature sequence is transmitted on the first time-frequency resource block; the first time-frequency resource block is reserved for multiple signature sequences, and the multiple signature sequences comprises a target signature sequence group, and the target signature sequence group is associated with a first shared channel resource group in the first period; the first reference shared channel resource unit belongs to the first shared channel resource group.

In one embodiment, the first time-frequency resource block is reserved for multiple sequences, and the first signature sequence is a signature sequence of the multiple signature sequences.

In one embodiment, a number of the multiple signature sequences on the first time-frequency resource block is 64.

In one embodiment, the multiple signature sequences on the first time-frequency resource block comprises the target signature sequence group and the first signature sequence.

In one embodiment, the target signature sequence comprises a positive integer number of signature sequence(s), any signature sequence of the positive integer signature sequence(s) comprised in the target signature sequence group is associated with a shared channel resource unit in the first period, and the first signature sequence is not associated with any shared channel resource unit in the first period.

In one embodiment, the positive integer number of signature sequence(s) in the target signature sequence group is(are) associated with the first shared channel resource group, and the first shared channel resource group comprises X shared channel resource unit(s).

In one embodiment, the first shared channel resource group belongs to the first period.

In one embodiment, the X shared channel resource unit(s) comprised in the first shared channel resource group belongs (belong) to the positive integer number of shared channel resource unit(s) in the first period.

In one embodiment, any of the positive integer number of signature sequence(s) in the target signature sequence group is associated with a shared channel resource unit in the first shared channel resource group.

In one embodiment, the first reference shared channel resource unit is a shared channel resource unit in the X shared channel resource unit(s) comprised in the first shared channel resource group.

In one embodiment, the first signature sequence is not associated with any of the positive integer number of shared channel resource unit(s) comprised in the first period.

In one embodiment, the first signature sequence is not associated with any shared channel resource unit in the first shared channel resource group.

In one embodiment, the first signature sequence is not associated with the first reference shared channel resource unit.

In one embodiment, the first reference shared channel resource unit is a last shared channel resource unit in the X shared channel resource unit(s) comprised in the first shared channel resource group.

In one embodiment, the first reference shared channel resource unit is a first shared channel resource unit in the X shared channel resource unit(s) comprised in the first shared channel resource group.

In one embodiment, the first reference shared channel resource unit is a specific shared channel resource unit in the X shared channel resource unit(s) comprised in the first shared channel resource group.

In one embodiment, an index of the specific shared channel resource unit in the X shared channel resource unit(s) is configured by a higher-layer signaling.

In one embodiment, an index of the specific shared channel resource unit in the X shared channel resource unit(s) is pre-defined.

Embodiment 7A

Figure 7A:
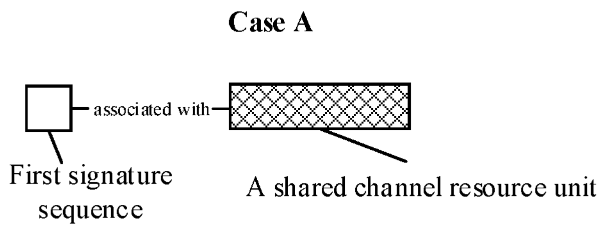
FIG. 7A illustrates a schematic diagram of a relation between a first signature sequence and a shared channel resource unit according to one embodiment of the present disclosure.

Embodiment 7A illustrates a schematic diagram of a relation between a first signature sequence and a shared channel resource unit according to one embodiment of the present disclosure, as shown in FIG. 7A. In FIG. 7A, the unfilled rectangle represents a first signature sequence in the present disclosure. In case A of the FIG. 7A, the cross line filled rectangle represents a shared channel resource unit in the present disclosure.

In case A of the Embodiment 7A, the first signature sequence in the present disclosure is associated with a shared channel resource unit in the first period; the shared channel resource unit in the first period is used for transmitting the first signal; in case B of the Embodiment 7A, the first signature sequence in the present disclosure is not associated with any shared channel resource unit in the first period.

In one embodiment, the shared channel resource unit in the first period is a shared channel resource unit in the Nu shared channel resource unit(s) comprised in the first period.

In one embodiment, the shared channel resource unit in the first period comprises multiple REs.

In one embodiment, the shared channel resource unit in the first period is reserved for a PUSCH.

In one embodiment, the shared channel resource unit in the first period is reserved for a UL-SCH.

In one embodiment, the shared channel resource unit in the first period is reserved for a random access.

In one embodiment, the shared channel resource unit in the first period is reserved for MsgA of 2-step random access.

In one embodiment, the shared channel resource unit in the first period is reserved for MsgA of Type-2 random access.

In one embodiment, the shared channel resource unit in the first period is reserved for a PUSCH payload of MsgA of Type-2 random access.

In one embodiment, at least one candidate sequence in the candidate sequence group in the first period is associated with a shared channel resource unit in the Nu shared channel resource unit(s) in the first period.

In one embodiment, at least one candidate sequence in the candidate sequence group in the first period is not associated with any shared channel resource unit in the Nu shared channel resource unit(s) in the first period.

In one embodiment, when the first signature sequence is associated with a shared channel resource unit of the Nu shared channel resource unit(s) in the first period, the shared channel resource unit of the Nu shared channel resource unit(s) in the first period is used for transmitting the first signal.

In one embodiment, when the first signature sequence is associated with one of the positive integer number of shared channel resource unit(s) on the positive integer number of second-type time-frequency resource block(s) comprised in the first period, one of the positive integer number of shared channel resource unit(s) on the positive integer number of second-type time-frequency resource block(s) comprised in the first period is used for transmitting the first signal.

In one embodiment, when the first signature sequence is not associated with any shared channel resource unit in the Nu shared channel resource unit(s) in the first period, transmission of the first signal is dropped before the first time window.

In one embodiment, when the first signature sequence is not associated with any of the positive integer number of shared channel resource unit(s) on the positive integer number of second-type time-frequency resource block(s) comprised in the first period, transmission of the first signal is dropped before the first time window.

In one embodiment, transmission of the first signal is dropped before the first time window includes transmitting the first signal after the first time window.

In one embodiment, transmission of the first signal is dropped before the first time window includes dropping transmission of the first signal.

In one embodiment, the phrase of dropping transmission of the first signal means that transmit power of the first signal is 0.

In one embodiment, the phrase of dropping transmission of the first signal means that the first signal is not generated on a baseband.

In one embodiment, the first signature sequence being associated with a shared channel resource unit in the first period includes that the first signature sequence is used for indicating the shared channel resource unit in the first period out of the Nu shared channel resource unit(s) comprised in the first period.

In one embodiment, the first signature sequence being associated with a shared channel resource unit in the first period includes that the first signature sequence is used for indicating a time-frequency location of a shared channel resource unit in the first period.

In one embodiment, the first signature sequence is associated with a shared channel resource unit in the first period includes that the first time-frequency resource block is used for determining the second time-frequency resource block.

In one embodiment, the first signature sequence is associated with a shared channel resource unit in the first period includes that time-domain resources of the first time-frequency resource block are shifted backward by a first time interval to acquire time-domain resources of the second time-frequency resource block.

In one embodiment, the first time interval comprises a positive integer number of slot(s).

In one embodiment, the first time interval comprises a positive integer number of multicarrier symbol(s).

In one embodiment, the first signature sequence is associated with a shared channel resource unit in the first period includes that the first time-frequency resource block is used for determining the second time-frequency resource block, and an index of the first signature sequence in the Q0 candidate sequence(s) on the first time-frequency resource block is used for determining the shared channel resource unit in the positive integer number of shared channel resource unit(s) on the second time-frequency resource block.

In one embodiment, the first signature sequence is associated with a shared channel resource unit in the first period includes that an index of the first signature sequence in the Q signature sequence(s) comprised in the candidate sequence group is used for determining an index of the shared channel resource unit in the first period in the Nu shared channel resource unit(s) comprised in the first period.

In one embodiment, the first signature sequence is associated with a shared channel resource unit in the first period includes that an index of the first signature sequence in the Q signature sequence(s) comprised in the candidate sequence group is used for determining the second time-frequency resource block and an index of the shared channel resource unit in the first period in the positive integer number of shared channel resource unit(s) on the second time-frequency resource block.

In one embodiment, the first signal is a baseband signal.

In one embodiment, the first signal is a radio-frequency signal.

In one embodiment, the first signal is a radio signal.

In one embodiment, the first signal is transmitted on a UL-SCH.

In one embodiment, the first signal is transmitted on a PUSCH.

In one embodiment, the first signal is transmitted on the second time-frequency resource block in the first period.

In one embodiment, the first signal is transmitted on the shared channel resource unit associated with the first signature sequence in the first period.

In one embodiment, the first signal comprises all or part of a higher-layer signaling.

In one embodiment, the first signal comprises all or part of an RRC signaling.

In one embodiment, the first signal comprises one or more fields of an RRC IE.

In one embodiment, the first signal comprises all or part of a Multimedia Access Control (MAC) layer signaling.

In one embodiment, the first signal comprises one or more fields in a MAC Control Element (CE).

In one embodiment, the first signal comprises one or more fields of a PHY layer signaling.

In one embodiment, the first signature sequence is an RA preamble, and the first signal comprises RRC connection related information.

In one embodiment, the first signature sequence is an RA preamble, and the first signal comprises small data.

In one embodiment, the first signature sequence is an RA preamble, and the first signal comprises Control-Plane (C-Plane) information.

In one embodiment, the first signature sequence is an RA preamble, and the first signal comprises User-Plane (U-Plane) information.

In one embodiment, the first signature sequence is an RA preamble, and the first signal comprises an RRC Message.

In one embodiment, the first signature sequence is an RA preamble, and the first signal comprises a Non-Access Stratum (NAS) message.

In one embodiment, the first signature sequence is an RA preamble, and the first signal comprises Service Data Adaptation Protocol (SDAP) data.

In one embodiment, the first signature sequence is preamble of a MsgA in random access, and the first signal is a PUSCH payload of a MsgA in random access procedure.

In one embodiment, the first signature sequence is a PRACH preamble of a MsgA in Type-2 Random Access Procedure, and the first signal is a PUSCH payload of a MsgA in Type-2 Random Access Procedure.

In one embodiment, a channel occupied by the first signature sequence comprises a RACH, and a channel occupied by the first signal comprises a UL-SCH.

In one embodiment, a channel occupied by the first signature sequence comprises a PRACH, and a channel occupied by the first signal comprises a PUSCH.

In one embodiment, the RRC connection related information comprises at least one of RRC Connection Request, RRC Resume Request, RRC Resume Request1, RRC Reestablishment Request, RRC Reconfiguration Complete, RRC Handover Confirm or RRC Early Data Request.

In one embodiment, the RRC connection related information comprises at least one of RRC Connection Request, RRC Connection Resume Request, RRC Connection Reestablishment, RRC Handover Confirm, RRC Connection Reconfiguration Complete, RRC Early Data Request, RRC Setup Request, RRC Resume Request, RRC Resume Request1, RRC Reestablishment Request or RRC Reconfiguration Complete.

In one embodiment, a first bit block comprises a positive integer number of bit(s), and the first signal comprises all or part of bit(s) in the first bit block.

In one embodiment, a first bit block is used for generating the first signal, and the first bit block comprises a positive integer number of bit(s).

In one embodiment, the first bit block comprises a positive integer number of bit(s), and all or part of the positive integer number of bit(s) is(are) used for generating the first signal.

In one embodiment, the first bit block comprises one Codeword (CW).

In one embodiment, the first bit block comprises one Code Block (CB).

In one embodiment, the first bit block comprises one Code Block Group (CBG).

In one embodiment, the first bit block comprises one Transport Block (TB).

In one embodiment, the first signal is acquired after all or part of bits of the first bit block sequentially through transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation, Modulation and Upconversion.

In one embodiment, the first signal is an output after the first bit block is sequentially through a modulation mapper, a layer mapper, precoding, a resource element mapper, and multicarrier symbol generation.

In one embodiment, the channel coding is based on a polar code.

In one embodiment, the channel coding is based on a Low-density Parity-Check (LDPC) code.

In one embodiment, only the first bit block is used for generating the first signal.

In one embodiment, there exists a bit block other than the first bit block being used for generating the first signal.

In one embodiment, the definition of the Type-2 Random Access Procedure can be found in 3GPP TS38.213, section 8.

In one embodiment, the first signature sequence indicates a first identity, and the first signal carries a second identity.

In one embodiment, the first signature sequence indicates the first identity, and the first signal carries the first identity and the second identity.

In one embodiment, the first identity and the second identity are used for scrambling the first signal.

In one embodiment, the first signature sequence indicates the first identity, and the second identity is not carried by the first signature sequence.

In one embodiment, the first identity is an index of the first signature sequence of a positive integer number of signature sequence(s) configured in the first time-frequency resource block.

In one embodiment, the first identity is a Random Access Preamble Identity (RAPID).

In one embodiment, the first identity is an Extended RAPID.

In one embodiment, the second identity is a TC-RNTI.

In one embodiment, the second identity is a C-RNTI.

In one embodiment, the second identity is a random number.

In one embodiment, the second identity is a RA-RNTI.

In one embodiment, the second identity is a random number generated by the first node.

In one embodiment, the first identity is a positive integer.

In one embodiment, the first identity is a positive integer from 1 to 64.

In one embodiment, the first identity is a positive integer from 0 to 63.

In one embodiment, the second identity is a positive integer.

In one embodiment, the second identity comprises a positive integer number of bit(s).

In one embodiment, the second identity comprises 8 bits.

Embodiment 7B

Figure 7B:
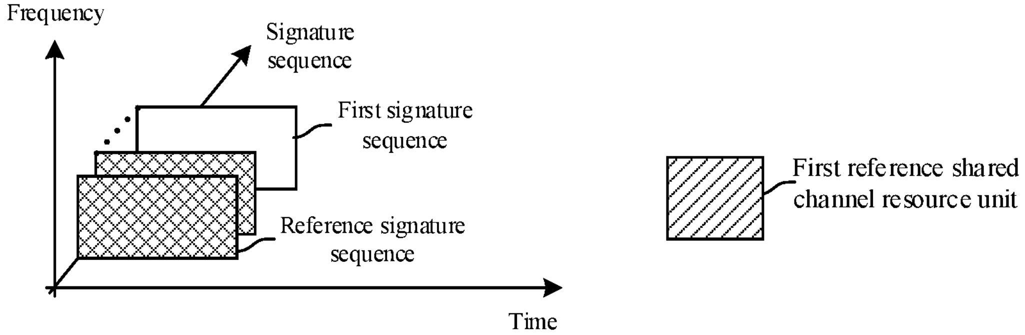
FIG. 7B illustrates a schematic diagram of relations among a first signature sequence, a reference signature sequence and a first reference shared channel resource unit according to one embodiment of the present disclosure.

Embodiment 7B illustrates a schematic diagram of relations among a first signature sequence, a reference signature sequence and a first reference shared channel resource unit according to one embodiment of the present disclosure, as shown in FIG. 7B.

In Embodiment 7B, the first time-frequency resource set comprises a first time-frequency resource block, and the first signature sequence is transmitted on the first time-frequency resource block; the first time-frequency resource block is reserved for multiple signature sequences, and the multiple signature sequences comprises the first signature sequence and a reference signature sequence; the reference signature sequence is associated with the first reference shared channel resource unit.

In one embodiment, the multiple signature sequences in the first time-frequency resource set comprise the first signature sequence and the reference signature sequence, the reference signature sequence is associated with the reference shared channel resource unit in the first period, and the first signature is not associated with any shared channel resource unit in the first period.

In one embodiment, the multiple signature sequences on the first time-frequency resource set comprise a target signature sequence group and the first signature sequence, the target signature sequence group comprises Y signature sequence(s), and any signature sequence in the target signature sequence group is associated with a shared channel resource unit in the first period.

In one embodiment, the Y signature sequence(s) comprised in the target signature sequence group belongs(belong) to the multiple signature sequence(s) on the first time-frequency resource block.

In one embodiment, the reference signature sequence is a signature sequence in the Y signature sequence(s) comprised in the target signature sequence group.

In one embodiment, the reference signature sequence is a first signature sequence in the Y signature sequence(s) comprised in the target signature sequence group.

In one embodiment, the reference signature sequence is a last signature sequence in the Y signature sequence(s) comprised in the target signature sequence group.

In one embodiment, the reference signature sequence is a middle signature sequence in the Y signature sequence(s) comprised in the target signature sequence group.

In one embodiment, the reference signature sequence is used for determining the first reference shared channel resource unit.

In one embodiment, an index of the reference signature sequence in the candidate sequence group is used for determining the reference shared channel resource unit in the first period.

In one embodiment, the reference signature sequence being associated with the first reference shared channel resource unit means that the first node transmits a target message group, the target message group comprises the reference signature sequence and the target sub-message, and the target sub-message is transmitted on the reference shared channel resource unit in the first period.

Embodiment 8A

Figure 8A:
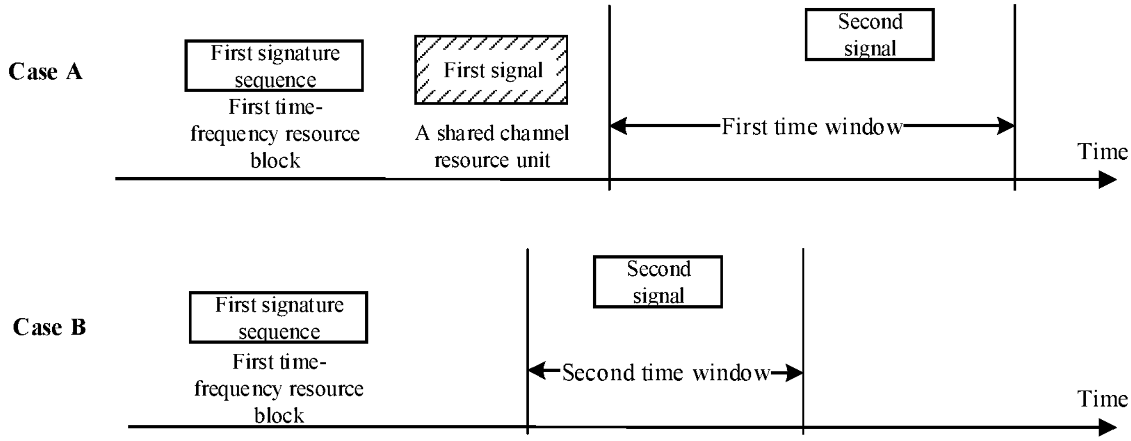
FIG. 8A illustrates a schematic diagram of a relation between a first time window and a second time window according to one embodiment of the present disclosure.

Embodiment 8A illustrates a schematic diagram of a relation between a first time window and a second time window according to one embodiment of the present disclosure, as shown in FIG. 8A.

In case A of the Embodiment 8A, when the first signature sequence is associated with a shared channel resource unit in the first period, a first signal in the shared channel resource unit in the first period is transmitted, a second signal is monitored in a first time window; in case B of the Embodiment 8A, when the first signature sequence is not associated with any shared channel resource unit in the first period, a second signal is monitored in a second time window; and a length of the first time window is a first time length, and a length of the second time window is a second time length.

In one embodiment, the first time window comprises a positive integer number of subframe(s).

In one embodiment, the first time window comprises a positive integer number of slot(s).

In one embodiment, the first time window comprises multiple multicarrier symbols.

In one embodiment, the first time window is an RAR window.

In one embodiment, the first time window is an RAR window of 2-step random access procedure.

In one embodiment, the first time window is an RAR window of Type-2 random access procedure.

In one embodiment, a number of the positive integer number of slot(s) comprised in the first time window is(are) indicated by the first signaling group.

In one embodiment, a length of the first time window is a duration of the first time window in time domain.

In one embodiment, a length of the first time window is a number of time-domain resource blocks occupied by the first time window.

In one embodiment, a length of the first time window is a number of slots occupied by the first time window.

In one embodiment, a length of the first time window is a number of subframes occupied by the first time window.

In one embodiment, the first time length is a positive integer.

In one embodiment, the first time length is measured by ms.

In one embodiment, the first time length is indicated by the first signaling group.

In one embodiment, the first time length is a length of an RAR window.

In one embodiment, the first time length is a length of an RAR window of Type-2 random access procedure.

In one embodiment, the first time length is up to 40 ms.

In one embodiment, the first time length does not exceed 40 ms.

In one embodiment, the first time length is 44 slots.

In one embodiment, the first time length is 720 slots.

In one embodiment, the shared channel resource unit in the first period with which the first signature sequence is associated is used for determining a start time of the first time window.

In one embodiment, the second time-frequency resource block is used for determining a start time of the first time window.

In one embodiment, the first time window is after the second time-frequency resource block.

In one embodiment, a start time of the first time window is after an end time of the second time-frequency resource block.

In one embodiment, the first time window is after the shared channel resource unit in the first period with which the first signature sequence is associated.

In one embodiment, the start time of the first time window is after an end time of the shared channel resource unit in the first period with which the first signature sequence is associated.

In one embodiment, the first time window and the second time-frequency resource block are spaced by a first time offset.

In one embodiment, a start time of the first time window and an end time of the second time-frequency resource block are spaced by a first time offset.

In one embodiment, the first time offset comprises a positive integer number of multi-carrier symbol(s).

In one embodiment, the first time offset comprises a positive integer number of slot(s).

In one embodiment, the first time offset is fixed.

In one embodiment, the first time offset is configurable.

In one embodiment, the first time offset is indicated by the first signaling group.

In one embodiment, the second time window comprises a positive integer number of subframe(s).

In one embodiment, the second time window comprises a positive integer number of slot(s).

In one embodiment, the second time window comprises multiple multicarrier symbols.

In one embodiment, the second time window is an RAR window.

In one embodiment, the second time window is an RAR window of 4-step random access procedure.

In one embodiment, the second time window is an RAR window of Type-1 random access procedure.

In one embodiment, a number of the positive integer number of slot(s) comprised in the second time window is(are) indicated by the first signaling group.

In one embodiment, a length of the second time window is a duration of the second time window in time domain.

In one embodiment, a length of the second time window is a number of time-domain resource blocks occupied by the second time window.

In one embodiment, a length of the second time window is a number of slots occupied by the second time window.

In one embodiment, a length of the second time window is a number of subframes occupied by the second time window.

In one embodiment, the second time length is a positive integer.

In one embodiment, the second time length is measured by ms.

In one embodiment, the second time length is indicated by the first signaling group.

In one embodiment, the second time length is a length of an RAR window.

In one embodiment, the second time length is a length of an RAR window of Type-1 random access procedure.

In one embodiment, the first time length is a length of an RAR window in 2-step random access procedure, and the second time length is a length of an RAR window of 4-step random access procedure.

In one embodiment, the first time length is a length of an RAR window of Type-2 random access procedure, and the second time length is a length of an RAR window of Type-1 random access procedure.

In one embodiment, the second time length is up to 10 ms.

In one embodiment, the second time length does not exceed 10 ms.

In one embodiment, the second time length is 11 slots.

In one embodiment, the second time length is 180 slots.

In one embodiment, the first time-frequency resource block is used for determining a start time of the second time window.

In one embodiment, the second time window is after the first time-frequency resource block.

In one embodiment, the start time of the second time window is after an end time of the first time-frequency resource block.

In one embodiment, the second time window and the first time-frequency resource block are spaced by a second time offset.

In one embodiment, a start time of the second time window and an end time of the first time-frequency resource block are spaced by a second time offset.

In one embodiment, the second time offset comprises a positive integer number of multi-carrier symbol(s).

In one embodiment, the second time offset comprises a positive integer number of slot(s).

In one embodiment, the second time offset is fixed.

In one embodiment, the second time offset is configurable.

In one embodiment, the second time offset is indicated by the first signaling group.

In one embodiment, the first signaling group indicates the first time length and the second time length.

In one embodiment, the first time length is not equal to the second time length.

In one embodiment, the first time length is not less than the second time length.

In one embodiment, the first time length is the same as the second time length.

In one embodiment, the first time length is greater than the second time length.

In one embodiment, the first signaling group indicates the first time length and a third time length, and the second time length is a smaller value of the first time length and the third time length.

In one embodiment, the third time length is a positive integer.

In one embodiment, the third time length is measured by ms.

In one embodiment, the third time length is indicated by the first signaling group.

In one embodiment, the third time length is a length of an RAR window.

In one embodiment, the first time length is a length of an RAR window of 2-step random access procedure, and the third time length is a length of an RAR window of 4-step random access procedure.

In one embodiment, the first time length is a length of an RAR window of Type-2 random access procedure, and the third time length is a length of an RAR window of Type-1 random access procedure.

In one embodiment, the third time length is up to 10 ms.

In one embodiment, the third time length does not exceed 10 ms.

In one embodiment, the third time length is 11 slots.

In one embodiment, the third time length is 180 slots.

In one embodiment, the first time length is not equal to the third time length.

In one embodiment, the first time length is not less than the third time length.

In one embodiment, the first time length is equal to the third time length.

In one embodiment, the first time length is greater than the third time length.

In one embodiment, when the first time length is greater than the third time length, the second time length is the third time length.

In one embodiment, when the first time length is greater than the third time length, the second time length is the third time length; when the first time length is less than the third time length, the second time length is the first time length.

In one embodiment, whether the first signature sequence is associated with a shared channel resource unit in the first period is used for determining whether the second signal is monitored in the first time window or the second time window.

In one embodiment, when the first signature sequence is associated with a shared channel in the first period, the second signal is monitored in the first time window; and when the first signature sequence is not associated with a shared channel resource unit in the first period, the second signal is monitored in the second time window.

In one embodiment, a first signature sequence and a second signature sequence are respectively two signature sequences in the Q0 signature sequences on the first time-frequency resource block, the first signature sequence is not associated with any shared channel resource unit in the first period, the second signature sequence is associated with a shared channel resource unit in the first period, and the shared channel resource unit in the first period is used for determining a start time of the second time window.

In one embodiment, a first signature sequence and a second signature sequence are respectively two signature sequences in the Q0 signature sequences on the first time-frequency resource block, when the first signature sequence is not associated with any shared channel resource unit in the first period, the second signature sequence is associated with a shared channel resource unit in the first period, and the first node monitors the second signal in the second time window; the shared channel resource unit in the first period with which the first signature sequence is associated is used for determining a start time of the second time window.

In one embodiment, a start time of the second time window is after an end time of the shared channel resource unit in the first period to which the second signature sequence is associated.

In one embodiment, a start time of the second time window and an end time of the shared channel resource unit in the first period to which the second signature sequence is associated are spaced by a third time offset.

In one embodiment, the third time offset comprises a positive integer number of multi-carrier symbol(s).

In one embodiment, the third time offset comprises a positive integer number of slot(s).

In one embodiment, the third time offset is fixed.

In one embodiment, the third time offset is configurable.

In one embodiment, the second signal comprises a baseband signal.

In one embodiment, the second signal comprises a radio-frequency signal.

In one embodiment, the second signal comprises a radio signal.

In one embodiment, a channel occupied by the second signal comprises a Physical Downlink Control Channel (PDCCH).

In one embodiment, a channel occupied by the second signal comprises a PDCCH and a Physical Downlink Shared Channel (PDSCH).

In one embodiment, the second signal comprises Downlink Control Information (DCI).

In one embodiment, the second signal comprises an RAR.

In one embodiment, the second signal comprises a successRAR.

In one embodiment, the second signal comprises a fallbackRAR.

In one embodiment, the definition of the successRAR can be found in 3GPP TS38.321.

In one embodiment, the definition of the fallbackRAR can be found in 3GPP TS38.321.

In one embodiment, the second signal comprises DCI and an RAR.

In one embodiment, the second signal comprises a Timing Advance Command.

In one embodiment, the second signal comprises an Uplink Grant.

In one embodiment, the second signal comprises a TC-RNTI.

In one embodiment, the first signal is a first message in random access procedure, and the second signal is a second message in random access procedure.

In one embodiment, the first signal is a MsgA of Type-2 random access procedure, and the second signal is a MsgB of Type-2 random access procedure.

In one embodiment, the second signal comprises all or part of a MAC layer signaling.

In one embodiment, the second signal comprises one or more fields of a MAC CE.

In one embodiment, the second signal comprises one or more fields in a MAC Protocol Data Unit (PDU).

In one embodiment, the second signal is a MAC PDU.

In one embodiment, the second signal is a MAC subPDU.

In one embodiment, the second signal comprises all or part of a higher-layer signaling.

In one embodiment, the second signal comprises one or more fields in a PHY layer.

In one embodiment, the second signal carries a positive integer number of first-type identity (identities).

In one embodiment, the second signal carries a positive integer number of second-type identity (identities).

In one embodiment, the second signal carries a positive integer number of first-type identity(identities) and a positive integer number of second-type identity(identities).

In one embodiment, any of the positive integer number of first-type identity(identities) is not carried by the second signal, and the second signal carries a positive integer number of second-type identity (identities).

In one embodiment, the second signal carries any a positive integer number of first-type identity(identities), and any of the positive integer number of second-type identity (identities) is not carried by the second signal.

In one embodiment, any of the positive integer number of first-type identity(identities) is a RAPID.

In one embodiment, any of the positive integer number of first-type identity(identities) is an Extended RAPID.

In one embodiment, at least one of the positive integer number of first-type identity(identities) is used for identifying a signature sequence of the Q0 signature sequence(s) on the first time-frequency resource block.

In one embodiment, one of the positive integer number of second-type identity(identities) is a TC-RNTI.

In one embodiment, one of the positive integer number of first-type identity(identities) is a C-RNTI.

In one embodiment, one of the positive integer number of first-type identity(identities) is a random number.

In one embodiment, the first identity carried by the first signal is one of the positive integer number of first-type identity(identities) carried by the second signal.

In one embodiment, the second identity carried by the first signal is one of the positive integer number of second-type identity(identities) carried by the second signal.

In one embodiment, the first signature sequence indicates one of the positive integer number of first-type identity (identities) carried by the second signal.

In one embodiment, the first identity indicated by the first signature sequence is one of the positive integer number of first-type identity(identities) carried by the second signal.

In one embodiment, the second identity comprised in the first signal is one of the positive integer number of second-type identity(identities) carried by the second signal.

In one embodiment, the first identity carried by the first signal is one of the positive integer number of first-type identity(identities) carried by the second signal, and the second identity carried by the first signal is one of the positive integer number of second-type identity(identities) carried by the second signal.

In one embodiment, the monitoring refers to a blind detection-based reception, that is, the first node receives a signal in a target time window and performs decoding operation; when the decoding according to a CRC bit is correct, judges that the second signal is detected in the target time window; otherwise, judges that the second signal is not detected in the first time window.

In one embodiment, the target time window is the first time window.

In one embodiment, the target time window is the second time window.

In one embodiment, the monitoring refers to a coherent detection based reception, that is, the first node performs a coherent reception on a radio signal with an RS sequence corresponding to a DMRS of the second signal in the target time window, and measures energy of a signal acquired after the coherent reception; if the energy of the signal acquired after the coherent reception is greater than a first given threshold, judges that the second signal is detected in the target time window; otherwise, judges that the second signal is not detected in the target time window.

In one embodiment, the monitoring refers to an energy detection-based reception, that is, the first node senses energy of a radio signal in the target time window and averages it on time to obtain received energy; if the received energy is greater than a second given threshold, judges that the second signal is detected in the target time window; otherwise, judges that the second signal is not detected in the target time window.

In one embodiment, the second message is detected refers to that after the second message is received based on a blind detection, decoding is determined to be correct according to a CRC bit.

In one embodiment, when the second signal is detected in the target time window, the first signature sequence is correctly received.

In one embodiment, when the second signal is not detected in the target time window, the first signature sequence is not correctly received.

In one embodiment, when the second signal is not detected in the target time window, the first signal is not correctly received.

In one embodiment, when the second signal is detected in the target time window, the second signal does not comprise the second identity, and the first signal is not correctly received.

Embodiment 8B

Figure 8B:
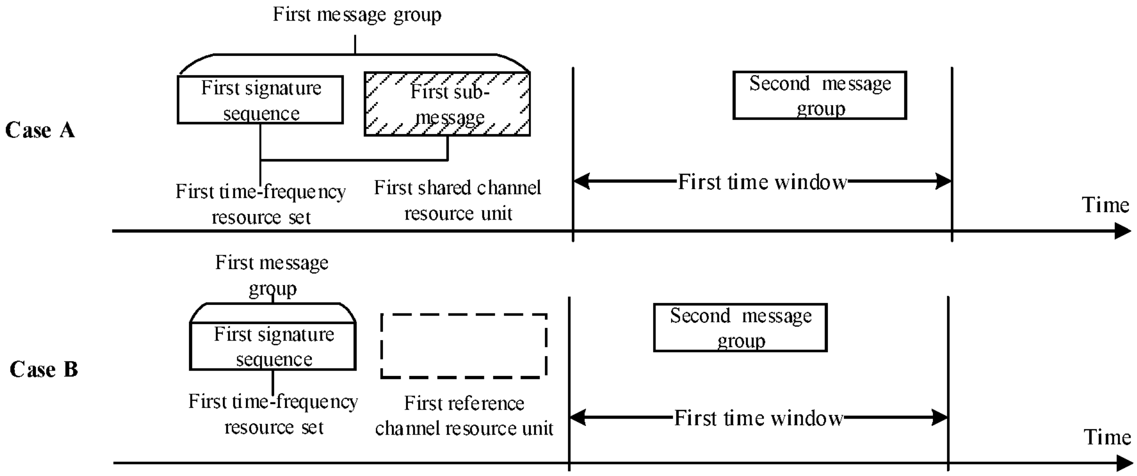
FIG. 8B illustrates a schematic diagram of relations among a first time window and a first shared channel resource unit and a first reference shared channel resource unit according to one embodiment of the present disclosure.

Embodiment 8B illustrates a schematic diagram of relations among a first time window, a first shared channel resource unit and a first reference shared channel resource unit according to one embodiment of the present disclosure, as shown in FIG. 8B.

In case A of the Embodiment 8B, the first message group comprises the first signature sequence and the first sub-message, the first time-frequency resource set comprises the first shared channel resource unit in the first period, the first signature sequence is associated with the first shared channel resource unit, and the first shared channel resource unit in the first period is used for determining a start of the first time window; in case B of the Embodiment 8B, the first message group comprises the first signature sequence, the first signature sequence is not associated with any shared channel resource unit in the first period, and the first reference shared channel resource unit in the first period is used for determining a start of the first time window.

In one embodiment, the first time window comprises a positive integer number of subframe(s).

In one embodiment, the first time window comprises a positive integer number of slot(s).

In one embodiment, the first time window comprises multiple multicarrier symbols.

In one embodiment, the first time window is an RAR window.

In one embodiment, the first time window is an RAR window of 2-step random access procedure.

In one embodiment, the first time window is an RAR window of Type-2 L1_random access procedure.

In one embodiment, a number of the positive integer number of slot(s) comprised in the first time window is(are) indicated by an RRC signaling.

In one embodiment, a length of the first time window is a duration of the first time window in time domain.

In one embodiment, a length of the first time window is a number of slots occupied by the first time window.

In one embodiment, a length of the first time window is a positive integer.

In one embodiment, a length of the first time window is measured by ms.

In one embodiment, a length of the first time window is up to 40 ms.

In one embodiment, a length of the first time window does not exceed 40 ms.

In one embodiment, a length of the first time window is 44 slots.

In one embodiment, a length of the first time window is 720 slots.

In one embodiment, the first time-frequency resource block is used for determining a start time of the second time window.

In one embodiment, the second time window is after the first time-frequency resource block.

In one embodiment, the start time of the second time window is after an end time of the first time-frequency resource block.

In one embodiment, the second time window and the first time-frequency resource block are spaced by a second time offset.

In one embodiment, a start time of the second time window and an end time of the first time-frequency resource block are spaced by a second time offset.

In one embodiment, when the first signature sequence is associated with the first shared channel resource unit in the first period, the first shared channel resource unit is used for determining a start time of the first time window.

In one embodiment, the second time-frequency resource block is used for determining a start time of the first time window, and the second time-frequency resource block is time-frequency resources occupied by the first shared channel resource unit in the first period.

In one embodiment, the first time window is located after the second time-frequency resource block in time domain.

In one embodiment, a start of the first time window is located after an end time of the second time-frequency resource block.

In one embodiment, the first time window is located after the first shared channel resource unit in the first period in time domain.

In one embodiment, a start of the first time window is located after an end of the first shared channel resource unit in the first period in time domain.

In one embodiment, the first time window and the second time-frequency resource block are spaced by a first time offset.

In one embodiment, a start time of the first time window and an end time of the second time-frequency resource block are spaced by a first time offset.

In one embodiment, the first time offset comprises a positive integer number of multi-carrier symbol(s).

In one embodiment, the first time offset comprises a positive integer number of slot(s).

In one embodiment, the first time offset is fixed.

In one embodiment, the first time offset is configurable.

In one embodiment, when the first signature sequence is not associated with any shared channel resource unit in the first period, the first shared channel resource unit in the first period is used for determining a start of the first time window.

In one embodiment, time-frequency resources occupied by the first reference shared channel resource unit in the first period is used for determining a start of the first time window.

In one embodiment, the first time window is after time-frequency resources occupied by the first reference shared channel resource unit in the first period.

In one embodiment, a start of the first time window is after an end of time-frequency resources occupied by the first reference shared channel resource unit in the first period.

In one embodiment, the first time window is after the first reference shared channel resource unit in the first period.

In one embodiment, a start of the first time window is after an end of the first reference shared channel resource unit in the first period.

In one embodiment, the first time window and time-frequency resources occupied by the first reference shared channel resource unit in the first period are spaced by a second time offset.

In one embodiment, a start of the first time window and an end time of time-frequency resources occupied by the first reference shared channel resource unit in the first period are spaced by a second time offset.

In one embodiment, the second time offset comprises a positive integer number of multi-carrier symbol(s).

In one embodiment, the second time offset comprises a positive integer number of slot(s).

In one embodiment, the second time offset is fixed.

In one embodiment, the second time offset is configurable.

In one embodiment, when the first signature sequence is associated with the first shared channel resource unit in the first period, the first shared channel resource unit is used for determining a start time of the first time window; and when the first signature sequence is not associated with any shared channel resource unit in the first period, the first shared channel resource unit in the first period is used for determining a start of the first time window.

In one embodiment, when the first signature sequence is associated with the first shared channel resource unit in the first period, a start of the first time window is that time-frequency resources occupied by the first shared channel resource unit are shifted backward by the first time offset; and when the first signature sequence is not associated with any shared channel resource unit in the first period, a start of the first time window is that the first reference shared channel resource unit in the first period is shifted backward by the second time offset.

In one embodiment, the first time window comprises a positive integer number of multicarrier symbol(s), a start of the first time window is a first multicarrier symbol in the positive integer number of multicarrier symbol(s) comprised in the first time window.

In one embodiment, a target multicarrier symbol is a start of the first time window.

In one embodiment, the target multicarrier symbol is a first multicarrier symbol of a positive integer number of multicarrier symbol(s) occupied by a target control channel resource set; and the target control channel resource set is an earliest control channel resource set after the first shared channel resource unit.

In one embodiment, the target multicarrier symbol is a first multicarrier symbol of a positive integer number of multicarrier symbol(s) occupied by a target control channel resource set; the target control channel resource set is an earliest control channel resource set after the first reference shared channel resource unit.

In one embodiment, the first period comprises a positive integer number of control channel resource set(s), and the target control channel resource set is one of the positive integer number of control channel resource set(s) comprised in the first period.

In one embodiment, any of the positive integer number of control channel resource set(s) comprised in the first period is used for transmitting control information.

In one embodiment, any of the positive integer number of control channel resource set(s) comprised in the first period is used for transmitting DCI.

In one embodiment, any of the positive integer number of control channel resource set(s) comprised in the first period is a Control Resource Set (CORESET).

In one embodiment, any of the positive integer number of control channel resource set(s) comprised in the first period occupies a positive integer number of multicarrier symbol(s) in time domain.

In one embodiment, the target control channel resource set is one of the positive integer number of control channel resource set(s) comprised in the first period.

In one embodiment, the target control channel resource set is a first control channel resource set located after the first reference shared channel resource unit in time in the positive integer number of control channel resource set(s) comprised in the first period.

In one embodiment, the target multicarrier symbol is located after the first reference shared channel resource unit in time.

Embodiment 9A

Figure 9A:
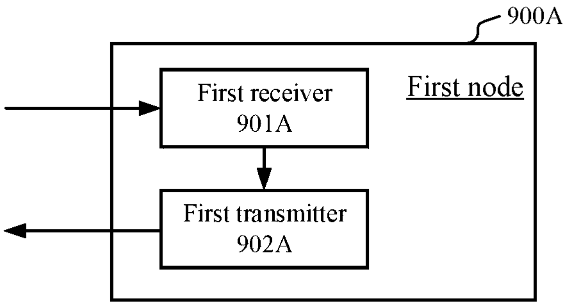
FIG. 9A illustrates a structure block diagram of a processing device in a first node according to one embodiment of the present disclosure.

Embodiment 9A illustrates a structure block diagram of a processing device used in a first node, as shown in FIG. 9A. In Embodiment 9A, a first node's processing device 900A mainly consists of a first receiver 901A and a first transmitter 902A.

In one embodiment, the first receiver 901A comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 902A comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In Embodiment 9A, the first receiver 901A receives a first reference-signal-resource set; the first transmitter 902A selects a first signature sequence out of a candidate sequence group in a first period, transmits a first signature sequence on a first time-frequency resource block; when the first signature sequence is associated with a shared channel resource unit in the first period, the first transmitter 902A transmits a first signal on the shared channel resource unit in the first period, the first receiver 901A monitors a second signal in a first time window; and when the first signature sequence is not associated with any shared channel resource unit in the first period, the first receiver 902A monitors a second signal in a second time window; measuring at the first reference-signal-resource set is used for determining a first channel quality; the first channel quality is not less than a first threshold; the phrase that the first channel quality is not less than a first threshold is used for determining the candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the first receiver 901A receives a first signaling group, and the first signaling group is used for indicating the first time length and the second time length.

In one embodiment, the first receiver 901A receives a second signaling group, and the second signaling group is used for indicating whether the first signature sequence is associated with a shared channel resource unit in the first period.

In one embodiment, the first signature sequence is associated with a shared channel resource unit in the first period, and the shared channel resource unit in the first period is used for determining a start time of the first time window.

In one embodiment, the first signature sequence is not associated with any shared channel resource unit in the first period, the first time-frequency resource block is used for determining a start time of the second time window.

In one embodiment, the first time-frequency resource block is reserved for a second signature sequence, and the second signature sequence is associated with a second shared channel resource unit in the first period; the first signature sequence is not associated with any shared channel resource unit in the first period, and the second shared channel resource unit is used for determining a start time of the second time window.

In one embodiment, the second signal is used for determining whether the first signature sequence is correctly received.

In one embodiment, the first node 900A is a UE.

In one embodiment, the first node 900A is a relay node.

In one embodiment, the first node 900A is a base station.

Embodiment 9B

Figure 9B:
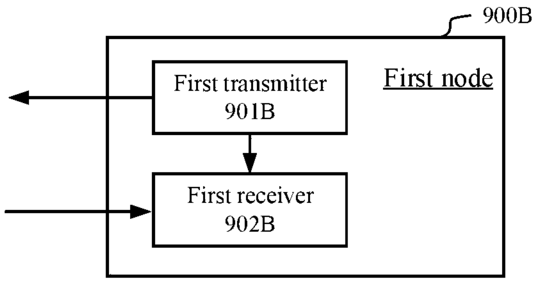
FIG. 9B illustrates a structure block diagram of a processing device in a first node according to one embodiment of the present disclosure.

Embodiment 9B illustrates a structure block diagram of a processing device used in a first node, as shown in FIG. 9B. In Embodiment 9B, a first node's processing device 900B mainly consists of a first transmitter 901B and a first receiver 902B.

In one embodiment, the first transmitter 901B comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In one embodiment, the first receiver 902B comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In Embodiment 9B, the first transmitter 901B transmits a first message group in a first time-frequency resource set, and the first message group comprises the first signature sequence. the first receiver monitors a second message group in a first time window; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the first time-frequency resource set comprises a first time-frequency resource block, and the first signature sequence is transmitted on the first time-frequency resource block; the first time-frequency resource block is reserved for multiple signature sequences, and the multiple signature sequences comprises a target signature sequence group, and the target signature sequence group is associated with a first shared channel resource group in the first period; the first reference shared channel resource unit belongs to the first shared channel resource group.

In one embodiment, the first time-frequency resource set comprises a first time-frequency resource block, and the first signature sequence is transmitted on the first time-frequency resource block; the first time-frequency resource block is reserved for multiple signature sequences, and the multiple signature sequences comprises the first signature sequence and a reference signature sequence; the reference signature sequence is associated with the first reference shared channel resource unit.

In one embodiment, the first receiver 902B receives first information; and the first information indicates the first reference shared channel resource unit.

In one embodiment, a start of the first time window is a target multicarrier symbol; the target multicarrier symbol is a first multicarrier symbol of a positive integer number of multicarrier symbol(s) occupied by a target control channel resource set; and the target control channel resource set is an earliest control channel resource set after the first reference shared channel resource unit.

In one embodiment, the first receiver 902B receives a first signaling group; the first receiver 902B receives a second signaling group; the first signaling group is used for indicating a candidate sequence set in the first period, and the multiple signature sequences on the first time-frequency resource block belong to the candidate sequence set in the first period; the second signaling group is used for indicating a shared channel resource set in the first period, and the reference shared channel resource unit is one shared channel resource unit of a positive integer number of shared channel resource unit(s) comprised by the shared channel resource set; and the candidate sequence set in the first period and the shared channel resource set in the first period are used together for determining the target signature sequence group.

In one embodiment, the first node 900B is a UE.

In one embodiment, the first node 900B is a relay node.

In one embodiment, the first node 900B is a base station.

Embodiment 10A

Figure 10A:
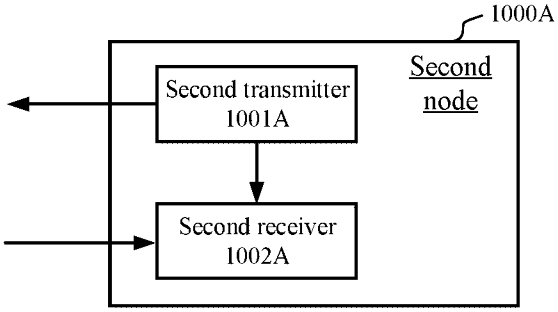
FIG. 10A illustrates a structure block diagram of a processing device in a second node according to one embodiment of the present disclosure.

Embodiment 10A illustrates a structure block diagram of a processing device in a second node, as shown in FIG. 10A. In FIG. 10A, a second node's processing device 1000A mainly consists of a second transmitter 1001A and a second receiver 1002A.

In one embodiment, the second transmitter 1001A comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the second receiver 1002A comprises at least one of the antenna 420, the transmitter/receiver 418, the multi-antenna receiving processor 472, the receiving processor 470, the controller/processor 475 or the memory 476 in FIG. 4 of the present disclosure.

In Embodiment 10A, the second transmitter 1001A transmits a first reference-signal-resource set; the second receiver 1002A receives a first signature sequence on a first time-frequency resource block; when the first signature sequence is associated with a shared channel resource unit in the first period, the second receiver 1002A receives a first signal on the shared channel resource unit in the first period, the second transmitter 1001A transmits a second signal in a first time window; and when the first signature sequence is not associated with any shared channel resource unit in the first period, the second transmitter 1001A transmits a second signal in a second time window; measuring at the first reference-signal-resource set is used for determining a first channel quality; the first channel quality is not less than a first threshold; the phrase that the first channel quality is not less than a first threshold is used for determining a candidate sequence group in the first period; the candidate sequence group in the first period comprises multiple candidate sequences, and the first signature sequence is a candidate sequence in the candidate sequence group in the first period; a length of the first time window is a first time length, and a length of the second time window is a second time length.

In one embodiment, the second transmitter 1001A transmits a first signaling group, and the first signaling group is used for indicating the first time length and the second time length.

In one embodiment, the second transmitter 1001A transmits a second signaling group, and the second signaling group is used for indicating whether the first signature sequence is associated with a shared channel resource unit in the first period.

In one embodiment, the first signature sequence is associated with a shared channel resource unit in the first period, and the shared channel resource unit in the first period is used for determining a start time of the first time window.

In one embodiment, the first signature sequence is not associated with any shared channel resource unit in the first period, the first time-frequency resource block is used for determining a start time of the second time window.

In one embodiment, the first time-frequency resource block is reserved for a second signature sequence, and the second signature sequence is associated with a second shared channel resource unit in the first period; the first signature sequence is not associated with any shared channel resource unit in the first period, and the second shared channel resource unit is used for determining a start time of the second time window.

In one embodiment, the second signal is used for indicating whether the first signature sequence is correctly received.

In one embodiment, the second node 1000A is a UE.

In one embodiment, the second node 1000A is a base station.

In one embodiment, the second node 1000A is a relay node.

Embodiment 10B

Figure 10B:
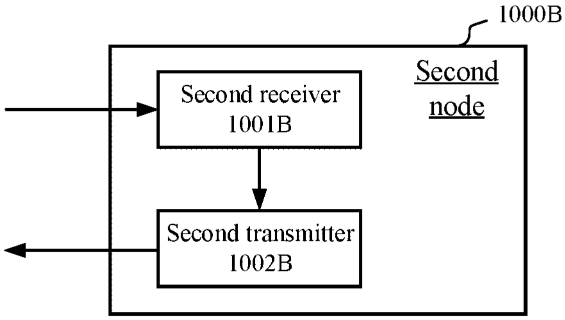
FIG. 10B illustrates a structure block diagram of a processing device in a second node according to one embodiment of the present disclosure.

Embodiment 10B illustrates a structure block diagram of a processing device in a second node, as shown in FIG. 10B. In FIG. 10B, a second node's processing device 1000B mainly consists of a second receiver 1001B and a second transmitter 1002B.

In one embodiment, the second receiver 1001B comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the second transmitter 1002B comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 10B, the second receiver 1001B receives a first message group in a first time-frequency resource set, and the first message group comprises the first signature sequence; the second transmitter 1002B transmits a second message group in a first time window; the second message group comprises a response to the first message group; when the first signature sequence is associated with a first shared channel resource unit in the first period, the first message group comprises a first sub-message, the first time-frequency resource set comprises the first shared channel resource unit in the first period, the first sub-message is transmitted on the first shared channel resource unit in the first period, and the first shared channel resource unit in the first period is used for determining a start of the first time window; when the first signature sequence is not associated with any shared channel resource unit in the first period, the first message group only comprises the first signature sequence, and a first reference shared channel resource unit is used for determining a start of the first time window.

In one embodiment, the first time-frequency resource set comprises a first time-frequency resource block, and the first signature sequence is transmitted on the first time-frequency resource block; the first time-frequency resource block is reserved for multiple signature sequences, and the multiple signature sequences comprises a target signature sequence group, and the target signature sequence group is associated with a first shared channel resource group in the first period; the first reference shared channel resource unit belongs to the first shared channel resource group.

In one embodiment, the first time-frequency resource set comprises a first time-frequency resource block, and the first signature sequence is transmitted on the first time-frequency resource block; the first time-frequency resource block is reserved for multiple signature sequences, and the multiple signature sequences comprises the first signature sequence and a reference signature sequence; the reference signature sequence is associated with the first reference shared channel resource unit.

In one embodiment, the second transmitter 1002B transmits first information; the first information indicates the first reference shared channel resource unit.

In one embodiment, a start of the first time window is a target multicarrier symbol; the target multicarrier symbol is a first multicarrier symbol of a positive integer number of multicarrier symbol(s) occupied by a target control channel resource set; and the target control channel resource set is an earliest control channel resource set after the first reference shared channel resource unit.

In one embodiment, the second transmitter 1002B transmits a first signaling group; the second transmitter 1002 transmits a second signaling group; the first signaling group is used for indicating a candidate sequence set in the first period, and the multiple signature sequences on the first time-frequency resource block belong to the candidate sequence set in the first period; the second signaling group is used for indicating a shared channel resource set in the first period, and the reference shared channel resource unit is one shared channel resource unit of a positive integer number of shared channel resource unit(s) comprised by the shared channel resource set; and the candidate sequence set in the first period and the shared channel resource set in the first period are used together for determining the target signature sequence group.

In one embodiment, the second node 1000B is a UE.

In one embodiment, the second node 1000B is a base station.

In one embodiment, the second node 1000B is a relay node.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, the UE comprising:
- a transmitter configured to transmit, as part of a 2-step random access procedure, a signature sequence in a Physical Random Access Channel (PRACH) occasion, wherein the signature sequence is randomly selected from a candidate sequence group in a period, wherein the candidate sequence group includes a plurality of sequences; and
- a receiver configured to, as part of the 2-step random access procedure:
  - on a condition that the signature sequence is associated with a shared channel resource unit in the period, monitor for Downlink Control Information (DCI) in a first time window, wherein the shared channel resource unit in the period is used for determining a start time of the first time window, and the start time of the first time window is after an end time of the shared channel resource unit in the period with which the signature sequence is associated; and
  - on a condition that the signature sequence is not associated with any shared channel resource unit in the period, monitor for the DCI in a second time window.

2. The UE of claim 1, wherein a time length of the first time window is equal to a time length of the second time window.

3. The UE of claim 1, wherein:
- the receiver is further configured to receive one or more Synchronization Signal/Physical Broadcast Channel (SS/PBCH) Blocks (SSBs);
- the UE further comprises a processor configured to measure a Reference Signal Received Power (RSRP) associated with an SSB of the one or more SSBs; and the candidate sequence group is determined based on the RSRP being not less than a threshold.

4. The UE of claim 1, wherein the DCI is associated with a MsgB Radio Network Temporary Identifier (MsgB-RNTI).

5. The UE of claim 1, wherein the signature sequence is not associated with any shared channel resource unit in the period, and the PRACH occasion is used for determining a start time of the second time window.

6. The UE of claim 5, wherein the start time of the second time window is after an end time of the PRACH occasion.

7. The UE of claim 1, wherein the period is an association pattern period.

8. The UE of claim 1, wherein the shared channel resource unit is a physical uplink shared channel (PUSCH) resource unit.

9. A method performed by a User Equipment (UE), the method comprising:

transmitting, as part of a 2-step random access procedure, a signature sequence in a Physical Random Access Channel (PRACH) occasion, wherein the signature sequence is randomly selected from a candidate sequence group in a period, wherein the candidate sequence group includes a plurality of sequences;

on a condition that the signature sequence is associated with a shared channel resource unit in the period, monitoring, as part of the 2-step random access procedure, for Downlink Control Information (DCI) in a first time window, wherein the shared channel resource unit in the period is used for determining a start time of the first time window, and the start time of the first time window is after an end time of the shared channel resource unit in the period with which the signature sequence is associated; and on a condition that the signature sequence is not associated with any shared channel resource unit in the period, monitoring, as part of the 2-step random access procedure, for the DCI in a second time window, wherein the PRACH occasion is used for determining a start time of the second time window, and the start time of the second time window is after an end time of the PRACH occasion.

10. The method of claim 9, wherein a time length of the first time window is equal to a time length of the second time window.

11. The method of claim 9, further comprising:

receiving one or more Synchronization Signal/Physical Broadcast Channel (SS/PBCH) Blocks (SSBs); and measuring a Reference Signal Received Power (RSRP) associated with an SSB of the one or more SSBs;

wherein the candidate sequence group is determined based on the RSRP being not less than a threshold.

12. The method of claim 9, wherein the DCI is associated with a MsgB Radio Network Temporary Identifier (MsgB-RNTI).

13. The method of claim 9, wherein the period is an association pattern period.

14. The method of claim 9, wherein the shared channel resource unit is a physical uplink shared channel (PUSCH) resource unit.

15. A User Equipment (UE) for wireless communications, the UE comprising:

a transmitter configured to transmit, as part of a 2-step random access procedure, a signature sequence in a Physical Random Access Channel (PRACH) occasion, wherein the signature sequence is randomly selected from a candidate sequence group in a period, wherein the candidate sequence group includes a plurality of sequences; and a receiver configured to, as part of the 2-step random access procedure:

on a condition that the signature sequence is associated with a shared channel resource unit in the period: monitor for Downlink Control Information (DCI) in a first time window, wherein the shared channel resource unit in the period is used for determining a start time of the first time window, and the start time of the first time window is after an end time of the shared channel resource unit in the period with which the signature sequence is associated; and on a condition that the signature sequence is not associated with any shared channel resource unit in the period: monitor for the DCI in a second time window, wherein the PRACH occasion is used for determining a start time of the second time window, and the start time of the second time window is after an end time of the PRACH occasion.

16. The UE of claim 15, wherein a time length of the first time window is equal to a time length of the second time window.

17. The UE of claim 15, wherein:

the receiver is further configured to receive one or more Synchronization Signal/Physical Broadcast Channel (SS/PBCH) Blocks (SSBs);

the UE further comprises a processor configured to measure a Reference Signal Received Power (RSRP) associated with an SSB of the one or more SSBs; and the candidate sequence group is determined based on the RSRP being not less than a threshold.

18. The UE of claim 15, wherein the DCI is associated with a MsgB Radio Network Temporary Identifier (MsgB-RNTI).

19. The UE of claim 15, wherein the period is an association pattern period.

20. The UE of claim 15, wherein the shared channel resource unit is a physical uplink shared channel (PUSCH) resource unit.

* * * * *